US008667244B2

(12) United States Patent
Hadley et al.

(10) Patent No.: US 8,667,244 B2
(45) Date of Patent: Mar. 4, 2014

(54) METHODS, SYSTEMS, AND APPARATUS TO PREVENT MEMORY IMPRINTING

(75) Inventors: Ted A Hadley, Sunnyvale, CA (US); Susan K Langford, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 418 days.

(21) Appl. No.: 13/052,755

(22) Filed: Mar. 21, 2011

(65) Prior Publication Data

US 2012/0246432 A1 Sep. 27, 2012

(51) Int. Cl.
*G06F 12/00* (2006.01)
(52) U.S. Cl.
USPC ............... 711/165; 711/162; 711/E12.002; 711/E12.084
(58) Field of Classification Search
USPC ............... 711/162, 165, E12.002, E12.084
See application file for complete search history.

(56) References Cited

U.S. PATENT DOCUMENTS

| | | | | |
|---|---|---|---|---|
| 5,742,792 | A * | 4/1998 | Yanai et al. | 711/162 |
| 5,940,863 | A | 8/1999 | Fimoff | |
| 7,007,141 | B2 * | 2/2006 | Li et al. | 711/162 |
| 7,120,832 | B2 * | 10/2006 | Collins et al. | 714/42 |
| 7,290,198 | B2 * | 10/2007 | Tamura et al. | 714/763 |
| 7,680,993 | B2 * | 3/2010 | Dougall | 711/159 |
| 7,689,577 | B2 * | 3/2010 | Thelen | 707/999.101 |
| 2004/0243656 | A1 | 12/2004 | Sung | |
| 2004/0255090 | A1 | 12/2004 | Guterman | |
| 2006/0282615 | A1* | 12/2006 | Lodolo et al. | 711/112 |
| 2008/0222430 | A1* | 9/2008 | Buscaglia et al. | 713/194 |
| 2008/0256104 | A1* | 10/2008 | Thelen | 707/101 |
| 2009/0292747 | A1* | 11/2009 | Shapiro | 707/204 |
| 2009/0319863 | A1* | 12/2009 | Shirai | 714/755 |

FOREIGN PATENT DOCUMENTS

JP 7105347 4/1995

OTHER PUBLICATIONS

Margret Rouse, "ECC (Error Correction Code or Error Checking and Correcting)", Sep., 2005, pp. 1-17, http://searchnetworking.techtarget.com/definition/ECC.*
Paul Massiglia, "The Raid Book: A Storage System Technology Handbook", 6th Edition, 1997, pp. 100-137.*
Bakalash et al., "A Barrel Shift Microsystem for Parallel Processing", Microprogramming and Microarchitecture, Proceedings of the 23rd Annual Workshop and Symposium., Nov. 27-29, 1990, pp. 223-229, Dept. Of Computer Science, State Univ. of NY.
Chen et al., "A Performance Evaluation of RAID Architectures", IEEE Transactions, Oct. 1996, pp. 1116-1130, vol. 45, Issue 10, Dept. of Computer Science, Univ of MA.

* cited by examiner

*Primary Examiner* — Edward Dudek, Jr.
*Assistant Examiner* — Christopher Birkhimer

(57) ABSTRACT

In one implementation, a data set including a plurality of data values having an order is stored at a memory having a plurality of memory locations. Each data value from the data set stored a current memory location of that data value from the plurality of memory locations. Each data value from the data set is periodically moved from the current memory location of that data value from the plurality of memory locations to a next memory location of that data value from the plurality of memory locations. The next memory location of each data value from the plurality of memory locations is the current memory location of that data value from the plurality of memory locations after the moving. The plurality of data values is then provided in the order to a client in response to a request for the data set.

21 Claims, 13 Drawing Sheets

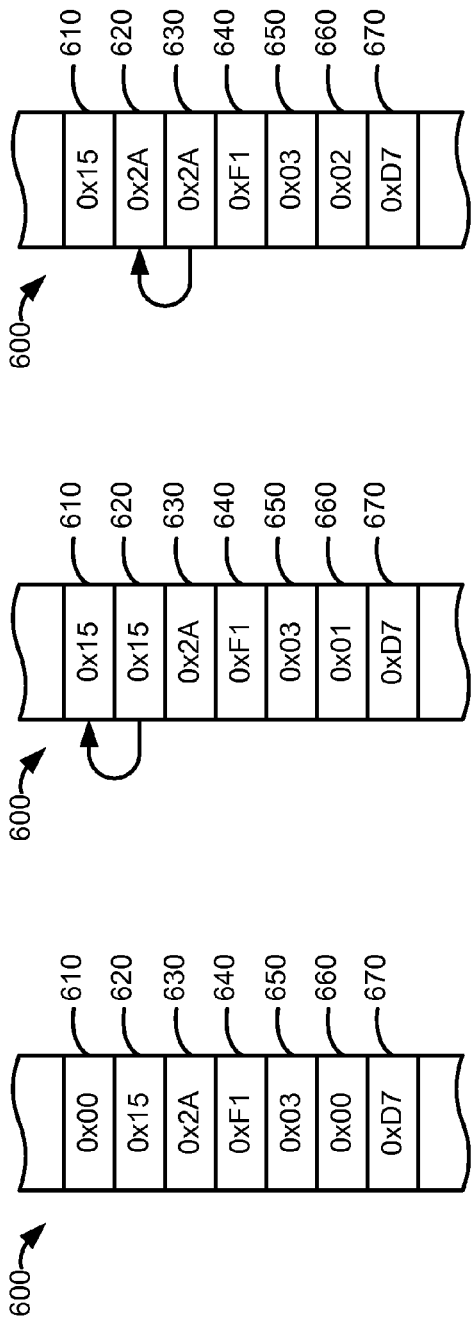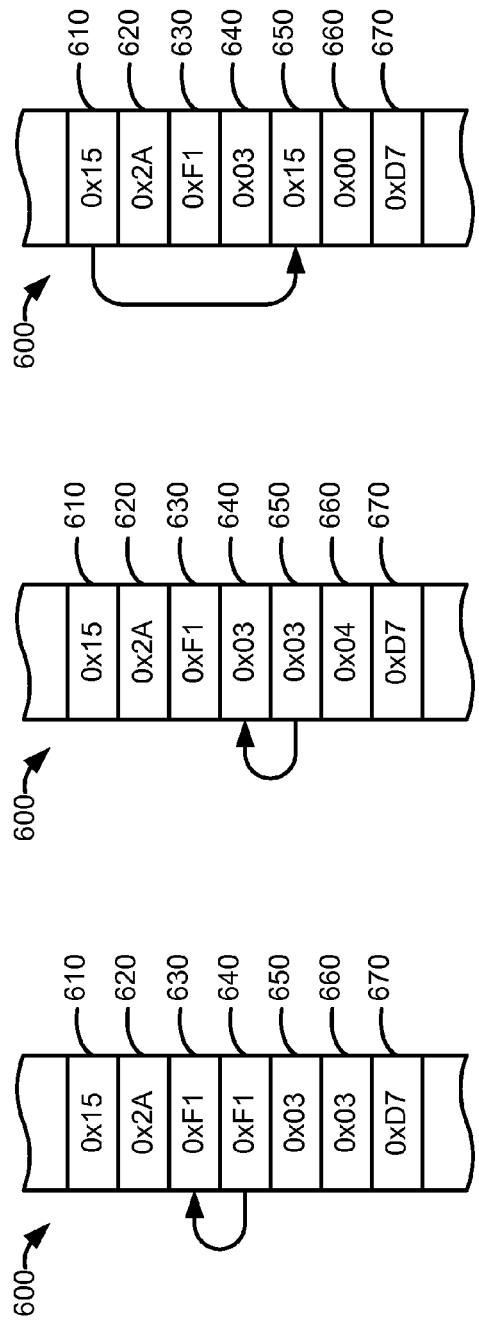

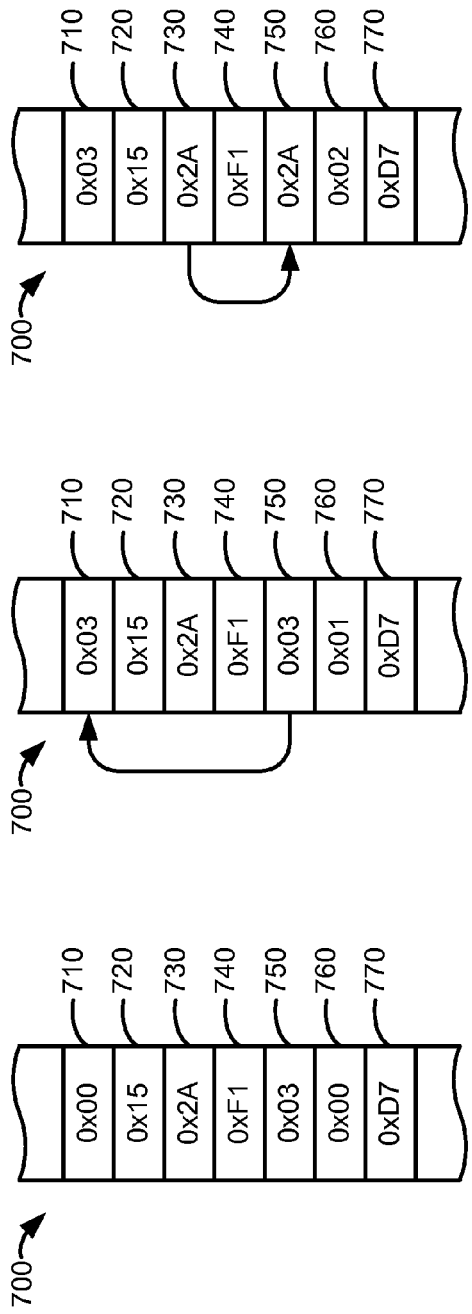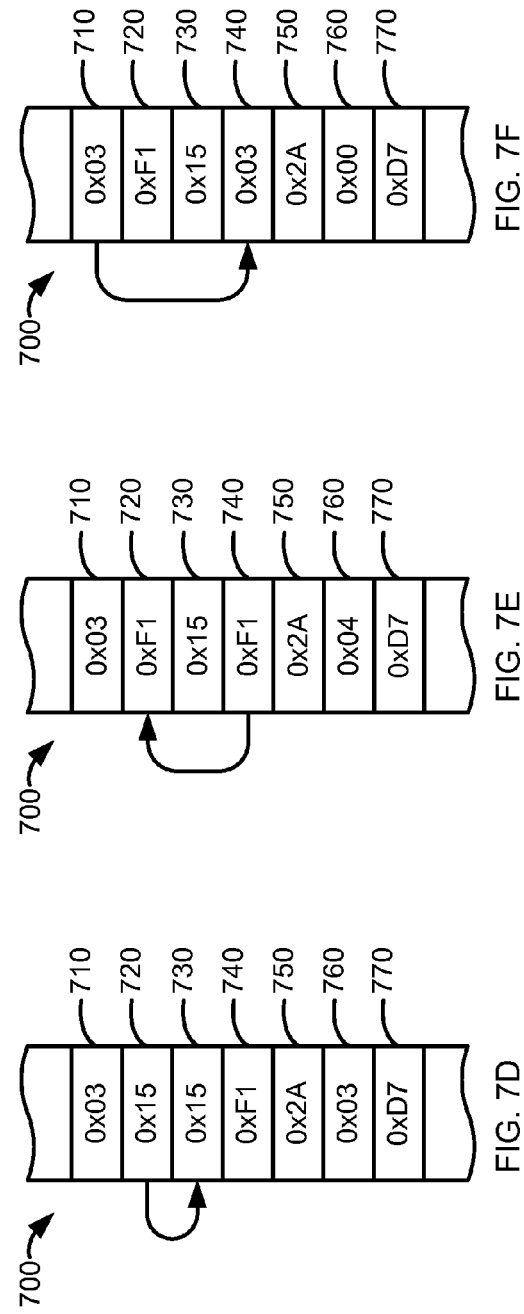

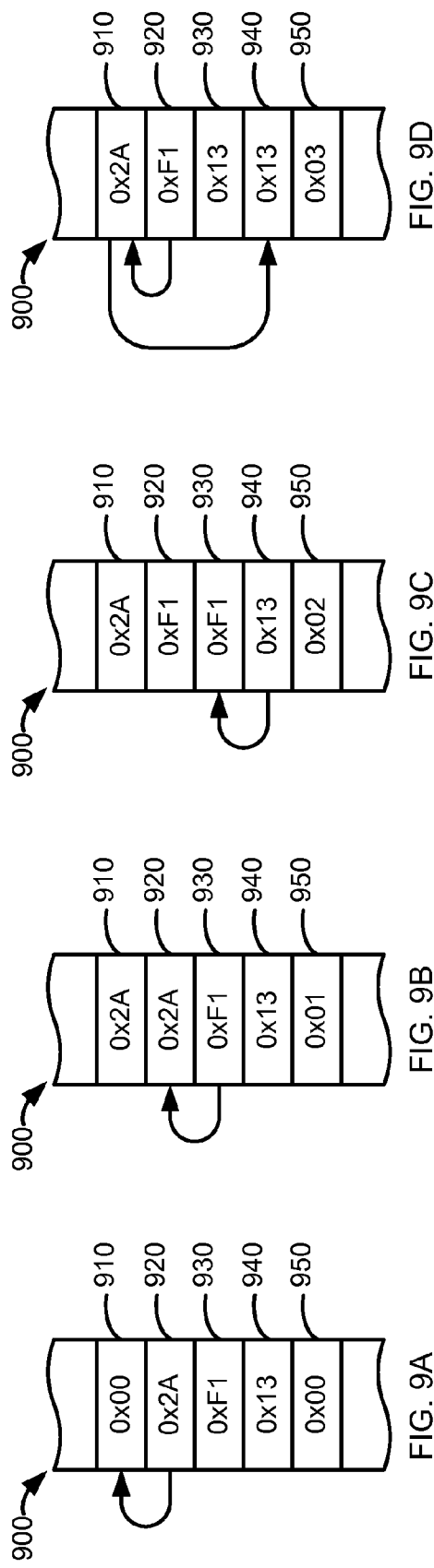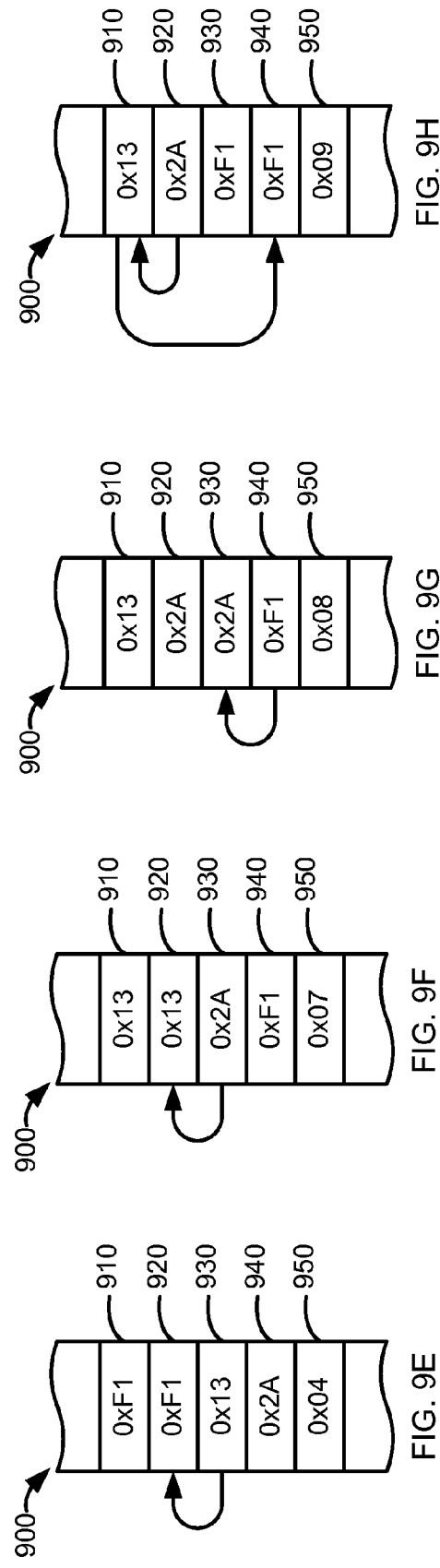

METHODS, SYSTEMS, AND APPARATUS TO PREVENT MEMORY IMPRINTING

BACKGROUND

Memories are used within computing devices to store data. For example, data are stored and accessed within computing devices such as personal computers, notebook and laptop computers, smartphones, personal digital assistants ("PDAs"), tablet and slate devices, personal entertainment devices such as MP3 players and media players, set-top boxes, gaming consoles, appliances, embedded devices, smart meters, and other computing devices at memories such as random-access memories ("RAMs").

Typically, data stored at RAMs or other memories of a computing device are accessed by a processor and some operation is performed by the processor based on the data. For example, an encryption key can be stored at a memory and a processor can access the encryption key to encrypt or decrypt a document.

BRIEF DESCRIPTION OF THE DRAWINGS

FIGS. 6A-6F are an illustration of a process to prevent imprinting at a memory, according to an implementation.

FIGS. 7A-7F are an illustration of a process to prevent imprinting at a memory, according to another implementation.

FIGS. 9A-9H are an illustration of a process to prevent imprinting at a memory, according to another implementation.

DETAILED DESCRIPTION

Figure 1:
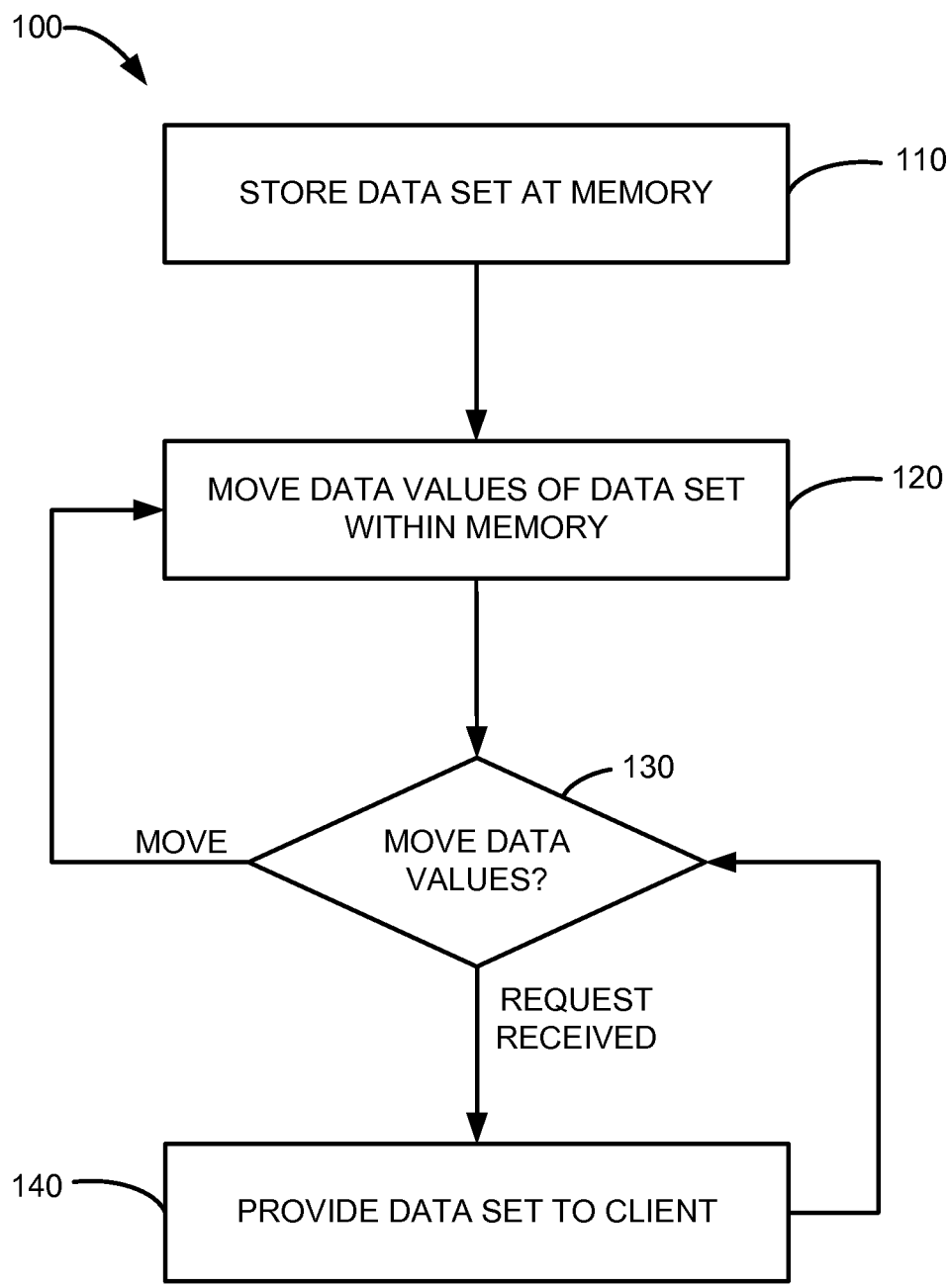
FIG. 1 is a flowchart of a process to prevent imprinting at a memory, according to an implementation.

Computer memories (or memories) such as static random-access memories ("SRAMs") and dynamic random-access memories ("DRAMs") are used to store information within computing devices such as computer servers, personal computers, laptop or notebook computers, smartphones, personal digital assistants ("PDAs"), tablet or slate computing devices, computing appliances, or other computing devices. Typically, such memories are semiconductor devices that store information (or data values) based on a state (e.g., a charge value, resistance value, or some other state) of the memory elements—often referred to as memory cells—that are included within these memories. Due to various properties of memories such as manufacturing processes, types and amounts of dopants, temperature, composition, or other properties, storage of data (or data values) at memories can alter the physical characteristics of the memories such that those data become imprinted at the memories. As a result of this memory imprinting, data values stored at memories can be determined or read even after those data values have been deleted or over-written at such memories or after volatile memories have been powered down. In other words, memories can be susceptible to imprinting of the data values stored at those memories (or memory imprinting).

Some memories are more susceptible to memory imprinting of particular data values such as bit values. That is, some memories are more susceptible to memory imprinting of, for example, a charged state than to memory imprinting of an uncharged state. Alternatively, some memories are more susceptible to memory imprinting of, for example, an uncharged state than to memory imprinting of a charged state. Yet other memories are equally susceptible to memory imprinting of a charged state and an uncharged state.

Memory imprinting is particularly problematic for memories that store data sets that are predominantly static or constant. That is, data sets that remain in a memory for extended periods of time without being altered can become imprinted at and, therefore, later determined from, that memory. As a specific example, data sets that include data values representing cryptographic keys are particularly susceptible to becoming imprinted at the memories at which these keys are stored. In other words, because such cryptographic keys are relatively constant, the memories at which cryptographic keys are stored can become imprinted with those cryptographic keys. After this memory imprinting occurs, the cryptographic keys can be determined from those memories even after those memories are removed from the computing devices including those memories. Thus, memory imprinting can compromise the security of cryptographic systems.

Implementations discussed herein can prevent (i.e., prevent entirely or mitigate) memory imprinting. That is, systems, apparatus, and processes discussed herein can mitigate imprinting of data sets at memories. Furthermore, implementations discussed herein can be recoverable such that interruption or disruption of systems, apparatus, and processes discussed herein does not corrupt data sets stored at memories.

For example, data values of a data set stored at various memory locations of a memory can be periodically moved to other memory locations of that memory according to one or more permutation patterns or schema. That is, the data values can be frequently moved from one memory location to another within a memory according to a pattern to prevent prolonged exposure of the memory elements of that memory to a particular data value and, therefore, particular state of those memory elements. Thus, memory imprinting is mitigated by frequently storing different data values at the memory locations of the memory. Moreover, each permutation state (or step) of the data set can be recorded to access the data set when the data set is requested or after interruption or disruption of a permutation.

As used herein, the singular forms "a," "an," and "the" include plural referents unless the context clearly dictates otherwise. Thus, for example, the term "memory" is intended to mean one or more memories or a combination of memories. Additionally, as used herein, the term "module" refers to hardware, circuitry such as circuitry implementing computing logic, or software, firmware, programming, machine- or processor-readable instructions, commands, or code that are stored at a memory and executed or interpreted (or hosted) at a processor.

FIG. 1 is a flowchart of a process to prevent imprinting at a memory, according to an implementation. Process 100 can be implemented as a hardware module, as a software module hosted at a computing device, or as a combination thereof. For example, process 100 can be implemented as application-specific circuitry or as a software module including instructions stored at a memory and executed at a processor in communication with the memory. More specifically, for example, process 100 can be implemented at a memory control module.

A data set is stored at a memory at block 110. That is, the data values of the data set are stored at memory locations of the memory. The data values of the data set are moved from the memory locations at which the data values are currently stored (i.e., from the current memory location of each data value) to other memory locations at block 120. In other words, the data values are permuted among the memory locations of the memory from a current memory location to a next memory location.

At block 130, a memory control module implementing process 100 determines whether the data values of the data set should be moved again. For example, the memory control module can determine at block 130 whether a period of time since a previous move or permutation of the data values has expired. If the period of time has expired, process 100 can proceed to block 120 to move the data values again. That is, the next memory location of each data value from the previous iteration at block 120 is the current memory location for this iteration at block 120. If the period of time has not expired, process 100 can wait at block 130 until the period of time expires or until a request for the data set is received. Alternatively, for example, process 100 can return to block 120 from block 130 immediately unless a request for the data set had been received. If a request for the data set had been received, process 100 proceeds to block 140.

The data set is provided to a client at block 140 and process 100 proceeds to block 130 at which the memory control module can determine whether the data values of the data set should be moved again. The client can be one or a variety of devices, services, software modules, or users that access (i.e., request and/or receive) data values stored at the memory via the memory control module. For example, the memory control module can be separate from a processor of a computing device and the processor can access a memory via the memory control module. Thus, the processor is a client of the memory control module. Alternatively, the memory control module can be included at a secure key storage device separate from a computing device and in communication with the computing device via an interface such as a Universal Serial Bus ("USB") interface. The secure key storage device can implement process 100 and provide cryptographic keys to the computing device in response to requests for the cryptographic keys. Thus, the computing device is a client of the secure key storage device.

Process 100 can include additional or fewer blocks than those illustrated in FIG. 1. For example, in some implementations, the data set received at block 110 is ordered. Said differently, the data values of the data set have an order relative one to another (or a relative order or ordering). For example, a memory stores data values as 8-bit bytes at each memory location of the memory. The data set is a cryptographic key that is 256 bits (or 32 bytes) long and, therefore, is stored at 32 memory locations of the memory. In other words, the cryptographic key includes 32 data values (8 bits each and each data value is stored at a memory location of the memory) that are ordered relative one to another. That is, the value of the cryptographic key is altered if the order of the data values of the cryptographic key is altered.

Because the data set is ordered, the data set can be rearranged prior to being provided to the client at block 140. That is, process 100 can include an additional block between blocks 130 and 140 at which the data values of the data set are moved within the memory or within another memory until the data values of the data set are in their relative order. After the data set is again ordered, the data set is provided to the client.

Additionally, one or more blocks of process 100 can be rearranged or discarded. Furthermore, although process 100 is discussed above with reference to an example environment within a memory control module, process 100 is applicable within other environments.

FIGS. 2-5 are schematic block diagrams of computing devices including memory control modules, according to one or more implementations. Although various implementations of computing devices and memory control modules are illustrated at FIGS. 2-5, these examples are not exhaustive and memory control modules, systems, and processes discussed herein are applicable to other computing devices or systems not illustrated in FIGS. 2-5.

Figure 2:
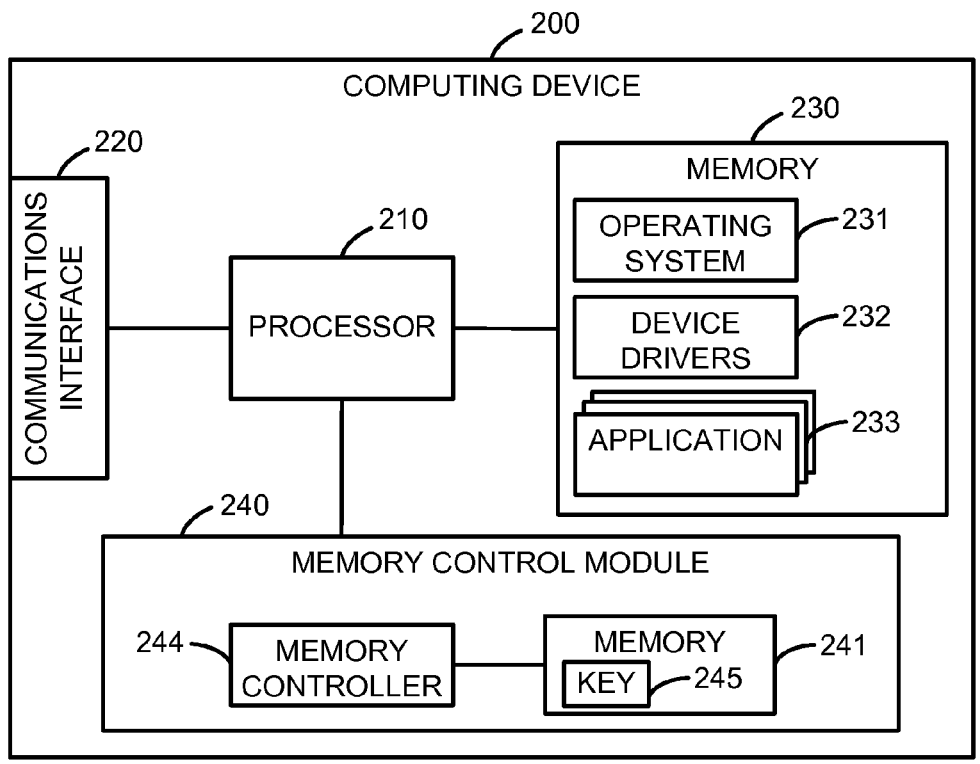
FIGS. 2-5 are schematic block diagrams of computing devices including memory control modules, according to one or more implementations.

FIG. 2 illustrates a computing device that includes a memory control module with an integrated memory. Computing device 200 includes processor 210, communication interface 220, memory 230, and memory control module 240. Processor 210 is any of a variety of processors. For example, processor 210 can be a general-purpose processor or an application-specific processor implemented as a hardware module and/or a software module hosted at a hardware module. A hardware module can be, for example, a microprocessor, a microcontroller, an application-specific integrated circuit ("ASIC"), a programmable logic device ("PLD") such as a field programmable gate array ("FPGA"), and/or other electronic circuits that perform operations. A software module can be, for example, instructions, commands, and/or codes stored at a memory and executed at another processor. Such a software module can be defined using one or more programming languages such as Java™, C++, C, an assembly language, a hardware description language, and/or another suitable programming language. For example, a processor can be a virtual machine hosted at a computer server including a microprocessor and a memory.

In some implementations, processor 210 can include multiple processors. For example, processor 210 can be a microprocessor including multiple processing engines (e.g., computation, algorithmic or thread cores). As another example, processor 210 can be a computing device including multiple processors with a shared clock, memory bus, input/output bus, and/or other shared resources. Furthermore, processor 210 can be a distributed processor. For example, processor 210 can include multiple computing devices, each including a processor, in communication one with another via a communications link such as a computer network.

Processor 210 is operatively coupled to communications interface 220, memory 230, and memory control module 240. Typically, as illustrated in FIG. 2, memory 230 includes instructions or codes (e.g., computer codes or object codes) defining software modules that are executed by processor 210 during operation of computing device 200. For example, memory 230 includes instructions that define operating system 231, device drivers 232, and applications 233 (e.g., software application programs). In other words, operating system 231, device drivers 232, applications 233, and other software modules stored as instructions (not shown) at memory 230 and executed at processor 210 are hosted at computing device 200. Applications 233 can include, for example, an application software module, a hypervisor, a virtual machine module, or an environment such as a runtime environment or virtual machine instance. As a specific example, applications 233 can include a cryptographic service such as a file encryption application.

In some embodiments, memory 230 is a volatile memory and computing device 200 includes a non-volatile (or non-transient) memory or processor-readable medium (not shown) such as a hard disk drive ("HDD"), a solid-state drive ("SSD"), a FLASH drive, or is in communication with a data storage service (e.g., via communications interface 220 and a communications link such as a communications network) at which software applications (e.g., computer codes or instructions that implement software applications when executed at a processor), data, or combinations thereof can be stored and accessed by processor 210. Such software applications, data, or combinations thereof can be moved or copied to memory 230 by processor 210 and accessed by processor 210 at memory 230 during operation of computing device 200.

Examples of processor-readable media include, but are not limited to: magnetic storage media such as a hard disk, a floppy disk, and/or magnetic tape; optical storage media such as a compact disc ("CD"), a digital video disc ("DVDs"), a compact disc read-only memory ("CD-ROM"), and/or a holographic device; magneto-optical storage media; non-volatile memory such as read-only memory ("ROM"), programmable read-only memory ("PROM"), erasable programmable read-only memory ("EPROM"), electronically erasable read-only memory ("EEPROM"), and/or FLASH memory; and random-access memory ("RAM"). Examples of computer code include, but are not limited to, micro-code or micro-instructions, machine instructions, such as produced by a compiler, and files containing higher-level instructions that are executed by a computer using an interpreter. For example, an implementation may be implemented using Java™, C++, or other object-oriented programming language and development tools. Additional examples of computer code include, but are not limited to, control signals, encrypted code, and compressed code.

Communications interface 220 is an interface accessible to processor 210 to communicate with (i.e., transmit symbols representing data to and receive such symbols from) other processors or computing devices via a communications link. In other words, communications interface 220 can receive data from processor 210 and transmit symbols representing those data via a communications link. Moreover, communications interface 220 can receive symbols from other communications interfaces via a communications link and send data represented by those symbols to processor 210. For example, communications interface 220 can be a telephone network interface, a twisted-pair network interface, a coaxial network interface, a fiber-optic network interface, a wireless network interface such as a wireless local area network ("WLAN") or a cellular network, or some other network or communications interface.

Memory control module 240 includes memory controller 244 and memory 241 at which key 245 is stored. Memory controller 244 includes circuitry, software hosted at that circuitry, or a combination thereof to implement a process to prevent memory imprinting at memory 241. Memory controller 244 periodically moves key 245 (i.e., data values of key 245), for example as discussed below in relation to FIGS. 6A-6F, 7A-7F, and 8A-8F, within memory 241 to prevent memory imprinting of key 245 at memory 241.

Key 245 is a data set such as a cryptographic key that is accessed by processor 210 for use within one or more of applications 233 such as a cryptographic service hosted at computing device 200. In other words, processor 210 requests key 245 at memory control module 240, uses key 245 to perform a cryptographic process based on instructions or codes stored at memory 230, and discards key 245.

Figure 3:
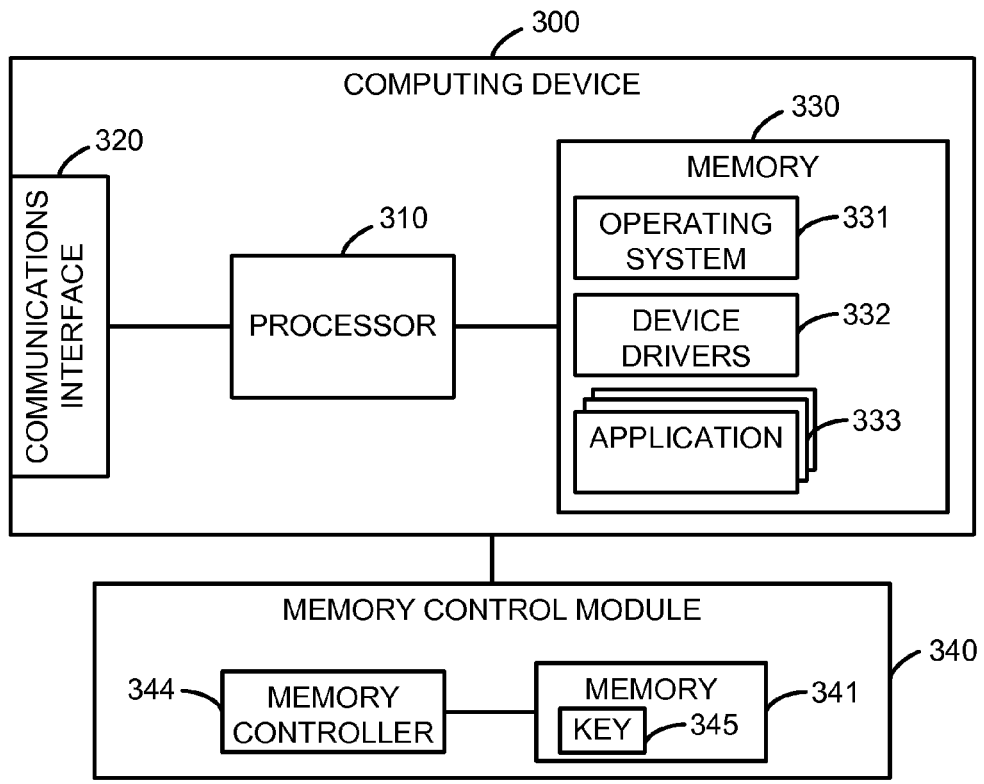

FIG. 3 illustrates a computing device and a memory control module with an integrated memory in communication with the computing device. Computing device 300 includes processor 310, communication interface 320, and memory 330.

Processor 310 is operatively coupled to communications interface 320, and memory 330. Typically, as illustrated in FIG. 3, memory 330 includes instructions or codes (e.g., computer codes or object codes) defining software modules that are executed by processor 310 during operation of computing device 310 similar to those discussed above in relation to FIG. 2. Moreover, communications interface 320 is an interface accessible to processor 310 to communicate with (i.e., transmit symbols representing data to and receive such symbols from) other processors or computing devices via a communications link as discussed above in relation to FIG. 2.

Memory control module 340 is separate (or separable) from computing device 300 and includes memory controller 344 and memory 341 at which key 345 is stored. Memory controller 344 includes circuitry, software hosted at that circuitry, or a combination thereof to implement a process to prevent memory imprinting at memory 341. For example, memory controller 344 can be a processor at memory control module 340. Memory controller 344 periodically moves key 345 (i.e., data values of key 345), for example as discussed below in relation to FIGS. 6A-6F, 7A-7F, and 8A-8F, within memory 341 to prevent memory imprinting of key 345 at memory 341.

Key 345 is a data set such as a cryptographic key that is accessed by computing device 300 for use within one or more of applications 333 such as a cryptographic service hosted at computing device 300. For example, computing device 300 can be in communication with memory control module 340 via an interface (not shown) such as a USB interface, a network (e.g., Ethernet) interface, or some other interface. In other words, processor 310 requests key 345 at memory control module 340, uses key 345 to perform a cryptographic process based on instructions or codes stored at memory 330, and discards key 345.

Figure 4:
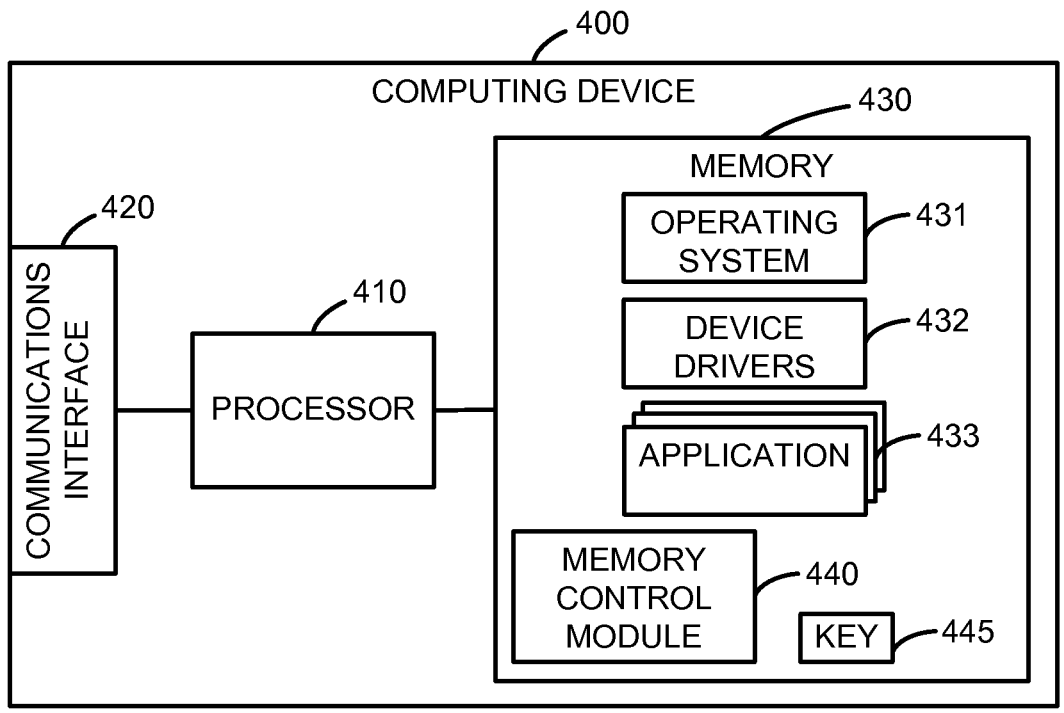

FIG. 4 illustrates a computing device hosting a memory control module. Computing device 400 includes processor 410, communication interface 420, and memory 430. Processor 410 is operatively coupled to communications interface 420, and memory 430. Communications interface 420 is an interface accessible to processor 410 to communicate with (i.e., transmit symbols representing data to and receive such symbols from) other processors or computing devices via a communications link as discussed above in relation to FIG. 2. Moreover, as illustrated in FIG. 4, memory 430 includes instructions or codes (e.g., computer codes or object codes) defining software modules that are executed by processor 410 during operation of computing device 410 similar to those discussed above in relation to FIG. 2.

Memory 430 also includes memory control module 440 and key 445. That is, memory control module 440 is hosted at processor 410. In other words, instructions or codes that define memory control module 440 are accessed at memory 430 by processor 410 and executed or interpreted by processor 410 to perform a process to prevent memory imprinting at memory 430. For example, computing device 400 hosts memory control module 440 to prevent key 445 from becoming imprinted within memory 430. As a specific example, memory control module 440 periodically moves key 445 (i.e., data values of key 445), for example as discussed below in relation to FIGS. 6A-6F, 7A-7F, and 8A-8F, within memory 430 to prevent memory imprinting of key 445 at memory 430.

Figure 5:
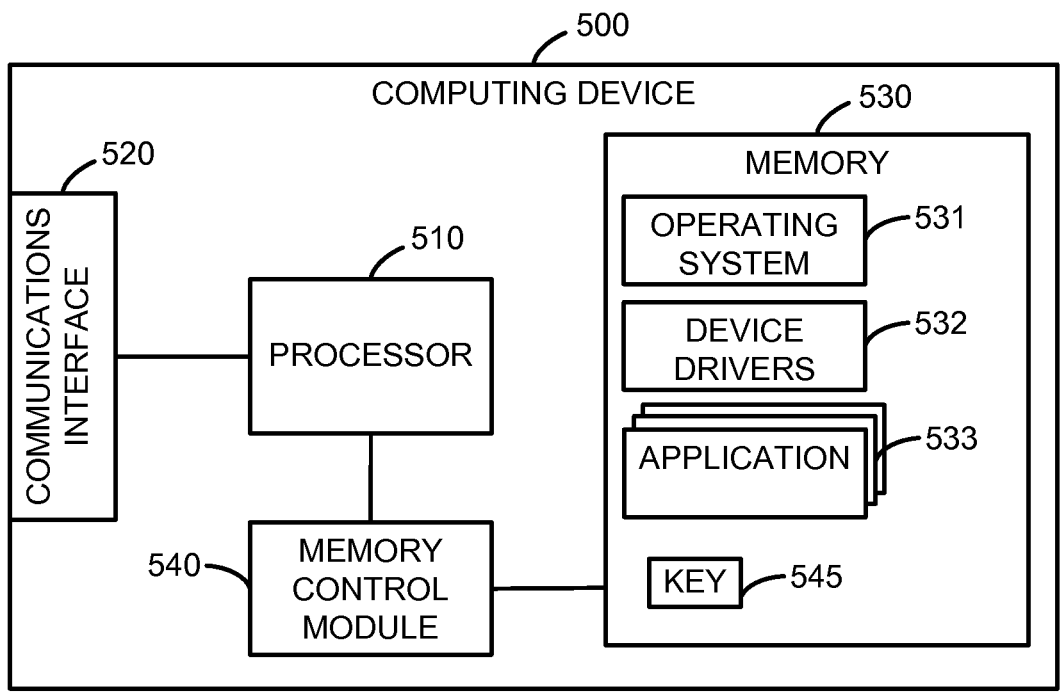

FIG. 5 illustrates a computing device including a memory control module. Computing device 500 includes processor 510, communication interface 520, memory 530, and memory control module 540. Processor 510 is operatively coupled to communications interface 520 and memory control module 540. Communications interface 520 is an interface accessible to processor 510 to communicate with (i.e., transmit symbols representing data to and receive such symbols from) other processors or computing devices via a communications link as discussed above in relation to FIG. 2. Moreover, as illustrated in FIG. 5, memory 530 includes instructions or codes (e.g., computer codes or object codes) defining software modules that are executed by processor 510 during operation of computing device 510 similar to those discussed above in relation to FIG. 2.

Memory control module 540 includes circuitry, software hosted at that circuitry, or a combination thereof to implement a process to prevent memory imprinting at memory 540. As a specific example, memory control module 540 periodically moves key 545 (i.e., data values of key 545), for example as discussed below in relation to FIGS. 6A-6F, 7A-7F, and 8A-8F, within memory 530 to prevent memory imprinting of key 545 (e.g., a cryptographic key) at memory 530. That is, memory control module 540 moves key 545 and/or other data values stored at memory locations of memory 530 to prevent those data values from becoming imprinted at memory 530.

Processor 510 accesses memory 530 via memory control module 540. More specifically, processor 510 requests access to data values at memory 530 from (or at) memory control module 540. That is, processor 510 provides a request for data values to memory control module 540, memory control module 540 accesses those data values at memory 530, and provides the requested data values to processor 510.

FIGS. 6A-6F are an illustration of a process to prevent imprinting at a memory, according to an implementation. The process illustrated at FIGS. 6A-6F can be implemented as a hardware module, as a software module hosted at a computing device, or as a combination thereof. For example, this process can be implemented as application-specific circuitry or as a software module including instructions stored at a memory and executed at a processor in communication with the memory. More specifically, for example, this process can be implemented at a memory control module.

Memory 600 includes memory locations 610, 620, 630, 640, 650, 660, and 670. As illustrated in FIGS. 6A-6F, memory 600 stores data in 8-bit (or 1-byte) words. A data set including values 0x2A, 0xF1, and 0x03 (hexadecimal values) is stored at memory locations 630, 640, and 650. A position indicator is stored at memory location 660. A position indicator is a value that identifies a current state or status of a movement or permutation of a data set. In other words, a position indicator identifies at what stage of a movement or permutation a data set currently exists. Said differently, the position indicator identifies a location of a data value or a group of data values (i.e., at which memory location the data value is presently stored). As such, the value of the position indicator changes during a movement or permutation of a data set. As a specific example, a position indicator identifies or is associated with a memory location at which a data value that is to be moved from that (i.e., a current) memory location to a different memory location.

A digest of the data set stored at memory locations 630, 640, and 650 is stored at memory location 670 and has a value of 0xD7. A digest is a value that is generated based on the data set. In some implementations, a digest is a value that is generated based on the at one time and is compared with another digest of the data set at another time to verify that the data set was not altered between the two times (or to validate the data set). For example, a digest can be the result of a cyclic redundancy check, an error-correcting code, or a cryptographic hash function such as SHA-1, SHA-256, SHA-512, MD5, or some other cryptographic hash function. Alternatively, for example, a digest can be a result of a series of arithmetic operations for which the data values of the data set are operands. As a specific example, a digest can be a sum of all the data values in the data set modulus 256 (or some other value). As yet another alternative, a digest can be a result of a series of logical operations for which the data values of the data set are operands. As a specific example, a digest can be generated by performing an exclusive OR ("XOR") operation iteratively on all the data values in the data set. Although not so illustrated in FIGS. 6A-6F, a digest can be moved with data values of data set and/or a data mark. In other words, for example, a data set that is moved within a memory can include a data mark, data values with a relative ordering one to another, and a digest.

A data mark having a value of 0x15 is stored at memory location 620. A data mark is a value or group of values that are used to identify a particular portion of a data set such as the beginning of a data set. That is, memory 600 can be searched for the data mark to determine the location of the data set. As a specific example, to access the data set in response to a request for the data set from a client, a memory control module can move the data values of the data set (as discussed in more detail herein) until the data mark is in a particular location such as, for example, memory location 620. The memory control module can then access the data values at known or predetermined (i.e., based on a movement or permutation pattern) memory locations relative to the current memory location of data mark.

Alternatively, for example, a memory control module can search (e.g., iterate through the memory locations of) the memory to identify or find the data mark. After the data mark is located, the position indicator can be accessed to determine the current state of the movement of the data set and the data set can be accessed, for example, in an order based on a relative ordering of the data values of the data set, at memory locations relative to the current memory location of the data mark and the current state of the movement of the data set. The relationship between the memory location at which the data mark and the memory locations at which the data values of the data set are stored can be determined based on, for example, a movement or permutation pattern.

After the data set has been located or collected from the memory based on the data mark and/or position indicator, the data set can be verified or validated by generating a new digest of the data set and comparing the new digest with the digest stored at memory location 670. If the new digest matches (i.e., has the same value as) the digest stored at memory location 670, the data set has not been altered and can be provided to a client. If the new digest does not match the digest stored at memory location 670, the memory control module can provide an error condition to the client, can search the data set again for the data mark, or can provide an error condition to the client and search the data set again for the data mark. For example, if the data set includes one or more data values that have the value of the data mark, the memory control module can erroneously identify those data values as the data mark. By searching the memory for the data mark again, the memory control module can locate the data mark and access the data set, again comparing a new digest generated from the accessed data set with the digest stored at memory location 670 to verify the data set.

In some implementations, a data mark has a value (either as a single value or as the aggregate of a group of values) that is unlikely to appear in a data set. For example, if a data set includes printable ASCII characters, a data mark of 0x00 can be appropriate. As another example, a data mark has a random or pseudo-random value. As yet another example, a data mark can have a data length (e.g., number of bytes or number of bits) that is sufficiently long that the probability of the data set or a subset of the data values of the data set having a value that is the same as the value of the data mark is lower than a predetermined probability. More specifically, for a memory that stores data values as words having K bytes, a data mark that occupies M memory locations (i.e., has a data length of M*K bytes) of the memory and a data set that occupies N memory locations (i.e., has a data length of N*K bytes) of that memory, an approximation of the probability P that the data mark occurs in a subset of those N and M memory locations other than at the data mark is:

$$P \cong \frac{M+N-1}{2^{(8*K*M)}}$$

In some implementations, the data mark can be referred to as being included in the data set. That is, because the data mark moves or is permuted with the data values of the data set as discussed in more detail herein, the data mark can be referred to as part of the data set.

The data set and data mark are stored at memory locations 630, 640, and 650 and 620, respectively, the position indicator at memory location 660 is initialized to a value of 0x00 (zero), and the digest is computed and stored at memory location 670 as illustrated in FIG. 6A. Memory location 610 is used as a temporary data storage location during movement or permutation of the data set. As illustrated in FIG. 6B, the data mark (0x15) is moved from memory location 620 to memory location 610, and the position indicator is then incremented to a value of 0x01. This value of the position indicator indicates that the first data value move has occurred in this movement of the data set. Moreover, the position indicator identifies the data value at memory location 630 as the next data value to be moved. That is, the position indicator is a zero-based index, where the value 0x00 of the position indicator is associated with memory location 620, of the memory location storing the data value that will be moved next. The data value stored at memory location 630 is then moved to memory location 620, and the position indicator is incremented to a value of 0x02 in FIG. 6C. As a specific example, the position indicator is incremented after the move (i.e., the data value stored at memory location 630 is moved to memory location 620) is complete. Thus, if process illustrated in FIGS. 6A-6F is interrupted or terminated before the move is complete, the move can be completed based on the value of the position indicator when the process is restarted.

Similarly, the data value stored at memory location 640 is moved to memory location 630 and the position indicator is incremented to a value of 0x03, and the data value stored at memory location 650 is moved to memory location 640 and the position indicator is incremented to a value of 0x04 (i.e., the sum of the number of memory locations occupied by the data set and the data mark), as illustrated in FIGS. 6D and 6E. This movement iteration of the data set is completed, as illustrated in FIG. 6F, when the data value at memory location 610 (which was originally stored at memory location 620) is moved to memory location 650 and the position indicator is reset to a value of 0x00.

The movement of data values illustrated in FIGS. 6B-6F can be repeated at predefined intervals, random times, or constantly to prevent memory imprinting at memory 600. Each round of movement through FIGS. 6B-6F can be referred to as a movement iteration (or iteration). During each movement iteration, the data values are moved from a current memory location of that data value to a next memory location for that data value. The current memory location of a data value for a movement iteration is the next memory location of that data value from the previous movement iteration.

In some implementations, not all data values of the data set are moved or permuted at (or during) each iteration. That is, some data values can remain at a current memory location for one or more iterations. Said differently, a movement or permutation of a data set can include one or more data values that remain in a current location for one or more iterations before being moved or permuted to a next memory location at another iteration. In other words, data values can be moved or permuted periodically within a memory although they are not moved or permuted at each iteration. Said yet another way, a movement or permutation pattern can include an iteration (or multiple iterations) during which the next memory location of a data value for that iteration is the current memory location of that data value. In other embodiments, each data value of a data set is moved or permuted at each iteration.

As illustrated in FIGS. 6A-6F, the data set and the data mark are rotated through memory locations 610, 620, 630, 640, and 650 of memory 600. That is, memory locations 610, 620, 630, 640, and 650 are sequential and the data set is rotated sequentially through or among these memory locations (i.e., the next memory location for a current memory location of a data value is sequentially subsequent to the current memory location). More specifically, a data value first stored at memory location 650 will be rotated to memory location 640, then to memory location 630, then to memory location 620, then to memory location 610, and finally back to memory location 650 during a series (or sequence) of movement iterations. In other implementations, the direction of the rotation can be reversed such that a data value first stored at memory location 610 will be rotated to memory location 620, then to memory location 630, then to memory location 640, then to memory location 650, and finally back to memory location 610 during a series (or sequence) of movement iterations. In some implementations, a processor can facilitate such rotations with rotation instructions, code, or blocks. That is, a processor can include a native or inherent rotate functionality and can be used to rotate data values among memory locations. As a specific example, a memory can be a register of a processor that can be natively (e.g., as a single operation) rotated.

In other words, the movement pattern illustrated in FIGS. 6A-6F is a rotation pattern. That is, the movement pattern defines the next memory location of a data value as the sequentially subsequent memory location of the current memory location of that data value. Thus, a movement or permutation pattern defines or describes the relationship between current memory locations and next memory locations. Said differently, a movement or permutation pattern to which memory location a data value at another memory location will be moved. FIGS. 7A-7F illustrate an example permutation pattern.

FIGS. 7A-7F illustrate a permutation of data values at a memory that is different from the rotation iterated at FIGS. 6A-6F. FIGS. 7A-7F are an illustration of a process to prevent imprinting at a memory, according to another implementation. The process illustrated at FIGS. 7A-7F can be implemented as a hardware module, as a software module hosted at a computing device, or as a combination thereof. For example, this process can be implemented as application-specific circuitry or as a software module including instructions stored at a memory and executed at a processor in communication with the memory. More specifically, for example, this process can be implemented at a memory control module.

In FIG. 7A, similar to memory 600 illustrated in FIG. 6A, memory 700 includes a temporary data storage location at memory location 710, a data mark with a value of 0x15 at memory location 720, a data set including data values 0x2A, 0xF1, and 0x03 at memory locations 730, 740, and 750, respectively, a position indicator at memory location 760, and a digest (or digest value) at memory location 770. FIGS. 7B-7F illustrate one iteration or round of permutation on (or of) the data set and data mark.

As illustrated in FIG. 7B, the data value stored at memory location 750 is moved to memory location 710 and the position indicator is updated to the value of 0x01 to indicate that a first stage or state of the permutation iteration is complete. Similarly, the data value stored at memory location 730 is moved to memory location 750 and the position indicator is updated to the value of 0x02 to indicate that a second stage or state of the permutation iteration is complete in FIG. 7C. The data value stored at memory location 720 is moved to memory location 730 and the position indicator is updated to the value of 0x03 to indicate that a third stage or state of the permutation iteration is complete in FIG. 7D. The data value stored at memory location 740 is moved to memory location 720 and the position indicator is updated to the value of 0x04 to indicate that a fourth stage or state of the permutation iteration is complete in FIG. 7E. Finally, the data value stored at memory location 710 (i.e., the data value that was originally stored at memory location 750 in FIG. 7A) is moved to memory location 740 and the position indicator is updated to the value of 0x00 to indicate that the permutation iteration is complete in FIG. 7F.

Similarly to FIGS. 6B-6F, the permutation of data values illustrated in FIGS. 7B-7F can be repeated at predefined intervals, random times, or constantly to prevent memory imprinting at memory 700. Each round of permutation through FIGS. 7B-7F can be referred to as a permutation iteration (or iteration). During each permutation iteration, the data values are moved from a current memory location of that data value to a next memory location for that data value. The current memory location of a data value for a permutation iteration is the next memory location of that data value from the previous permutation iteration.

The permutation according to which the data values are moved (or permutation pattern or permutation schema) can be static or dynamic. A static permutation is one that does not change over time or depend on input arguments or parameters. A dynamic permutation is a permutation that can change over time (i.e., a time-dependent permutation or permutation pattern) or depend on one or more input arguments, conditions, or parameters. For example, a permutation can be defined when a memory control module is instantiated or started based on a time or a random or pseudo-random value. Thus, the permutation (i.e., which memory location is the next memory location for each current memory location) can be defined or determined each time a memory control module is started.

In some implementations, a memory control module can determine whether the memory control module is starting after a clean shutdown, and generates a new permutation pattern if a start after a clean shutdown is determined. That is, for example, at an initial start, the memory control module can store a value in a non-volatile memory indicating that the memory control module is running and a description or identifier (i.e., an identifier of a predefined permutation pattern) of a permutation pattern. When the memory control module completes a shutdown procedure (i.e., is completing a clean shutdown), the memory control module can store a different value at that non-volatile memory to indicate that a clean shutdown has occurred. During a subsequent startup procedure of the memory control module, the memory control module can check the value at the non-volatile memory to determine whether the memory control module shutdown cleanly. If the value is the value indicating a clean shutdown, the memory control module generates a new permutation pattern, stores a description of that permutation pattern and the value indicating that the memory control module is running at the non-volatile memory, and proceeds to operate.

If the value is the value indicating that the memory control module is running, however, the memory control module can determine that the memory control module did not shutdown cleanly (e.g., the memory control module was interrupted or experienced a failure condition). The memory control module can determine the previous permutation pattern used by the memory control module (i.e., from the description of the permutation pattern at the non-volatile memory), recover any movements or permutations (as discussed in more detail herein) that were interrupted, and proceed to move data values at the memory operatively coupled to the memory control module to prevent memory imprinting at that memory.

FIGS. 8A-8F are an illustration of a process to prevent imprinting at a memory that does not include a data mark or a digest, according to another implementation. The process illustrated at FIGS. 8A-8F can be implemented as a hardware module, as a software module hosted at a computing device, or as a combination thereof. For example, this process can be implemented as application-specific circuitry or as a software module including instructions stored at a memory and executed at a processor in communication with the memory. More specifically, for example, this process can be implemented at a memory control module.

Figure 8A:
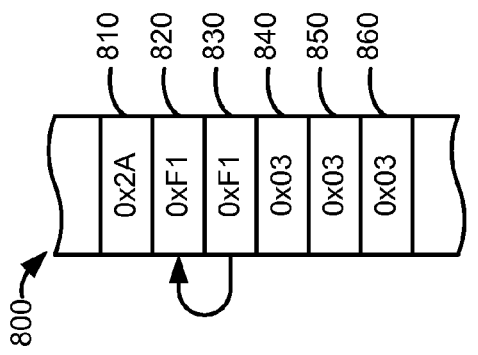
FIGS. 8A-8F are an illustration of a process to prevent imprinting at a memory, according to another implementation.

Rather than use a data mark and digest, a memory control module can store an iteration indicator at the memory. As illustrated in FIG. 8A, memory 800 includes a temporary data storage location at memory location 810, a data set including data values 0x2A, 0xF1, and 0x03 at memory locations 820, 830, and 840, respectively, a position indicator at memory location 850, and an iteration indicator at memory location 860. An iteration indicator identifies which iteration of a movement or permutation of a data set is presently (or currently) being executed or processed. As illustrated in FIG. 8A, the iteration indicator is initially set to a value of 0x03, equal to the number of data values in the data set. FIGS. 8B-8F illustrate one iteration or round of permutation on (or of) the data set and data mark. The position indicator is initially set to a value of 0x01. In some embodiments, a position indicator and an iteration indicator can be included at a single memory location (i.e., a position indicator and an iteration indicator can be concatenated and stored at a common memory location).

Figure 8B:
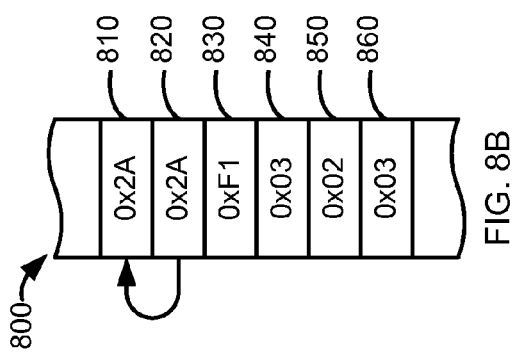
Figure 8C:
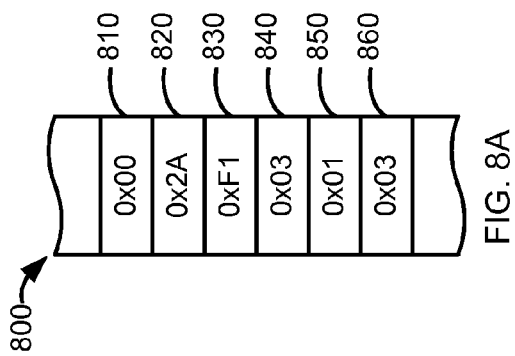

As illustrated in FIG. 8B, the data value stored memory location 820 is moved from memory location 820 to memory location 810. In the example illustrated in FIG. 8B, each time a data value is moved from one memory location to another, the iteration indicator (or the value of the iteration indicator) is compared with the position indicator (or the value of the position indicator). If the iteration indicator is equal to the position indicator, the iteration indicator is decremented by a value of one. Here, the iteration indicator has a value of 0x03 and the position indicator has a value of 0x01 and the iteration indicator is not changed. The position indicator is then incremented by one, as illustrated in FIG. 8B, to a value of 0x02. This value of the position indicator indicates that the first data value move has occurred in this movement iteration of the data set.

The data value stored at memory location 830 is then moved to memory location 820. After the data value is moved, the iteration indicator is compared with the position indicator. Here, the iteration indicator has a value of 0x03, the position indicator has a value of 0x02, and the iteration indicator is not changed. The position indicator is then incremented to a value of 0x03 in FIG. 8C.

Figure 8D:
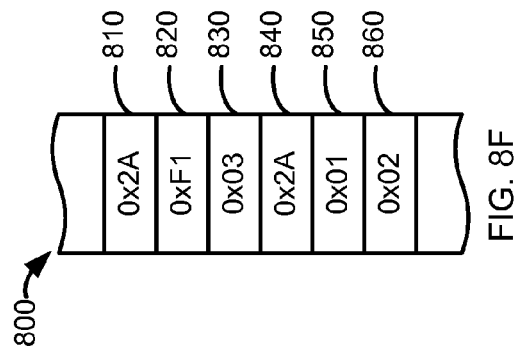

Similarly, the data value stored at memory location 840 is moved to memory location 830. After the data value is moved, the iteration indicator is compared with the position indicator. Here, the iteration indicator has a value of 0x03 and the position indicator has a value of 0x03. As discussed above, because the iteration indicator is equal to the position indicator, the iteration indicator is decremented to a value of 0x02. The position indicator is then incremented to a value of 0x04, as illustrated in FIG. 8D.

Figure 8E:
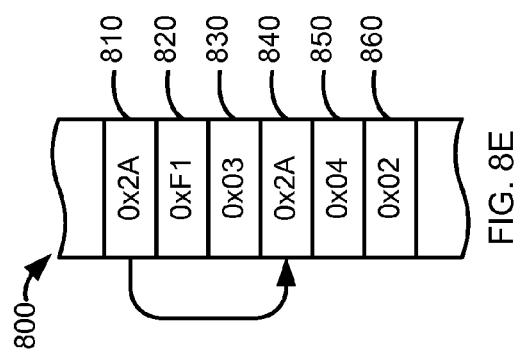
Figure 8F:
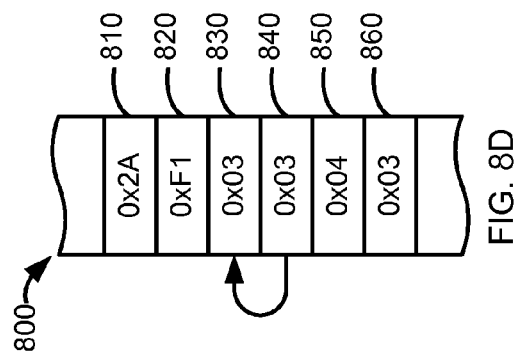

Because the position indicator has a value greater than the number of memory locations occupied by the data values of the data set (here, 0x03), the data value stored at memory location 810 (i.e., the data value initially stored at memory location 820 in FIG. 8A) is moved to memory location 840 as illustrated in FIG. 8E and the position indicator is set to a value of 0x01 as illustrated in FIG. 8F. In other words, when the position indicator has a value greater than the number of memory locations occupied by the data values of the data set, the current movement iteration of the data set is complete. That is, all the data values of the data set have been moved once.

After two additional iterations through FIGS. 8B-8F, the value of the iteration indicator will be 0x00 (zero) indicating that the data values of the data set are now in their initial memory locations (i.e., the data values of the data set are in the memory locations at which they are illustrated in FIG. 8A). Accordingly, the value of the iteration indicator can be set again to 0x03, the value of the position indicator can be set again to 0x01, and this process can be repeated. Because the combinations of the values of the iteration indicator and the position indicator uniquely identify each state of the data set (i.e., the relative memory locations of the data values of the data set), a memory control module implementing the process illustrated in FIGS. 8A-8F can access the iteration indicator and the position indicator and restart the process after interruption or a failure.

Moreover, similar to as discussed above, the memory control module can access the data set, in order if the data set is an ordered data set, based on the position indicator and the iteration indicator. In other words, because the values of the position indicator and the iteration indicator and the movement or permutation pattern are known to the memory control module, the memory control module can locate (or access) the data values of the data set within the memory.

More specifically, for example, as illustrated in FIG. 8A, the data values are in a sequential order beginning at memory location 820. Thus, the data set can be accessed in an order at sequential memory locations 820, 830, and 840. In other implementations, the data set can be distributed among the memory according to or based on a permutation patters, and the data set can be accessed according to the permutation pattern. That is, the placement of the data values of the data set at memory locations relative to the order of the data set is described by the permutation pattern.

FIGS. 9A-9H are an illustration of another process to prevent imprinting at a memory that does not include a data mark or a digest, according to another implementation. The process illustrated at FIGS. 9A-9H can be implemented as a hardware module, as a software module hosted at a computing device, or as a combination thereof. For example, this process can be implemented as application-specific circuitry or as a software module including instructions stored at a memory and executed at a processor in communication with the memory. More specifically, for example, this process can be implemented at a memory control module.

Memory 900 includes a temporary data storage location at memory location 910, a data set including data values 0x2A, 0xF1, and 0x03 at memory locations 920, 930, and 940, respectively, and a position indicator at memory location 950. The position indicator at memory location 950 is referred to in this example as a movement count because this position indicator (i.e. the movement count) indicates the numbers of times data values of the data set have been moved. The movement count can thus be used to recover the data set (i.e., location the data values of the data set and continue a movement iteration of the data set) in the event the process illustrated in FIGS. 9A-9H is interrupted.

More specifically, the movement count is initialized to 0x00 and the data value at memory location 920 is moved (or copied) to memory location 910 as illustrated in FIG. 9A. In other words, when the movement count (or the value of the movement count) modulo the number of data values in the data set (here, three) is zero, the data value at memory location 920 is moved to memory location 910. The movement count is then incremented (i.e., to indicate that a data value has been moved) to a value of 0x01 and the data value at memory location 930 is moved to memory location 920 as illustrated in FIG. 9B. That is, when the movement count modulo the number of data values in the data set is one, the data value at memory location 930 is moved to memory location 920. Similarly, the movement count is then again incremented to a value of 0x02 and the data value at memory location 940 is moved to memory location 930 as illustrated in FIG. 9C. Said differently, when the movement count modulo the number of data values in the data set is two, the data value at memory location 940 is moved to memory location 930.

The movement count is again incremented to value of 0x03 as illustrated in FIG. 9D. Each time the movement count is incremented, the value of the movement count modulo the number of data values in the data set (here, three) is determined. As illustrated in FIG. 9D, if the result is zero, the data value at memory location 910 is moved to memory location 940. As discussed above, because the result is zero, the data value at memory location 920 is moved to memory location 910. FIG. 9D illustrates these movements.

The movement count is incremented to a value of 0x04 and the data value at memory location 930 is moved to memory location 920 because 0x04 (the value of the movement count) modulo three (the number of data values in the data set) is one as illustrated in FIG. 9E. The process continues as discussed above for movement count values of 0x05 and 0x06 (not shown). FIG. 9F illustrates movement of the data value at memory location 930 to memory location 920 when the movement count is 0x07 and the movement count modulo the number of data values in the data set is again one. As illustrated in FIG. 9G, the movement count is incremented to a value of 0x08 and the data value at memory location 940 is moved to memory location 930.

The movement count is again incremented to a value of 0x09, as illustrated in FIG. 9H, and the data value the data value at memory location 910 is moved to memory location 940 because the result of the movement count modulo the number of data values in the data set is zero. Also because the result is zero, the data value at memory location 920 is moved to memory location 910. Furthermore, if the result is zero, the movement count is divided (with any remainder portion ignored or discarded) by the number of data values in the data set (here, three). If the result of this division operation is the number of data value in the data set, the data values of the data set are at their respective starting memory locations (i.e., the memory location at which the data values were included in FIG. 9A) and the movement count is reset to 0x00. That is, the data set and the movement count are again in the state illustrated in FIG. 9A.

Similarly as discussed in relation to FIGS. 8A-8F, because each value of the movement count is uniquely associated with a state of the data set (i.e., which movement was last processed or completed), the movement count can be used by, for example, a memory control module implementing the process illustrated in FIGS. 9A-9H can access the movement count and the position indicator and restart the process after interruption or a failure. That is, the memory control module can access the movement indicator, determine the state of the data set, and proceed moving the data values of the data set at the last movement indicated by the movement count.

Figure 10:
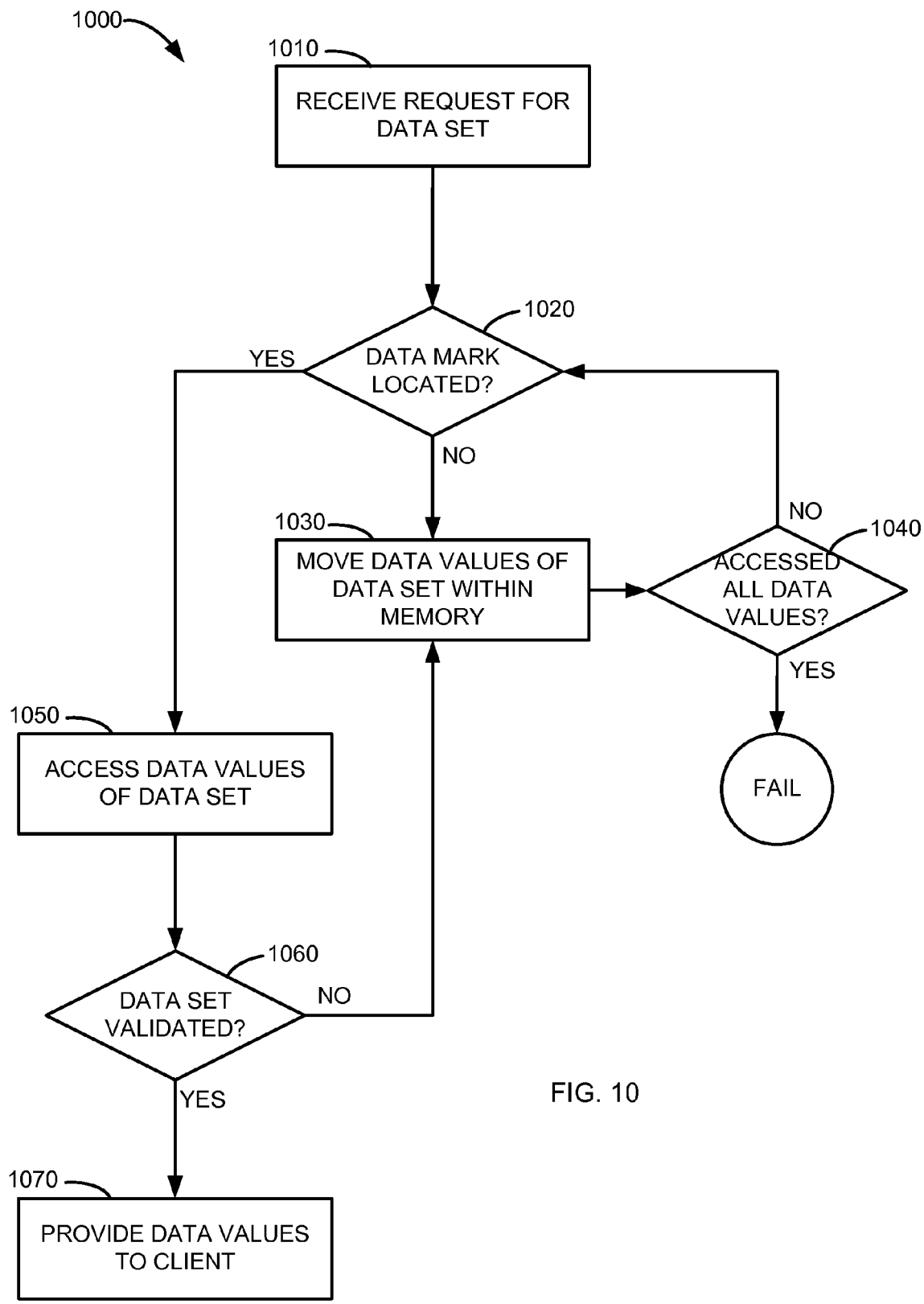
FIG. 10 is a flowchart of a process to access a data set at a memory, according to an implementation.

FIG. 10 is a flowchart of a process to access a data set at a memory, according to an implementation. Process 1000 can be implemented as a hardware module, as a software module hosted at a computing device, or as a combination thereof. For example, process 1000 can be implemented as application-specific circuitry or as a software module including instructions stored at a memory and executed at a processor in communication with the memory. More specifically, for example, process 1000 can be implemented at a memory control module.

A request for a data set stored at a memory is received, for example, at a memory control module at block 1010. The memory control module determines at block 1020 whether a data mark is located at a particular memory location (e.g., a first memory location) or particular group of memory locations of a memory. That is, the memory control module determines whether the data value stored at that particular memory location (or data values stored at a particular group of memory locations) is the data mark.

If the data mark is not located at that memory location or group of memory locations, process 1000 proceeds to block 1030 and the memory control module moves the data values of the data set within the memory. For example, the memory control module can move the data values according to one movement or permutation iteration as discussed above in relation to FIGS. 6A-6F or 7A-7F. If all the data values of the data set (i.e., a data set including the data mark) have been accessed at block 1040, process 1000 can report a failure. That is, if all the data values of the data set have been accessed to determine whether the data mark is located at block 1020, the data mark does not exist in the data set and an error has occurred. If not all the data values have been accessed at block 1040, process 1000 proceeds to block 1020 and the data value at the particular memory location is accessed to determine whether that data value is the data mark.

Returning to block 1020, if the data value stored at the particular memory location is the data mark, process 1000 proceeds to block 1050 to access the data values of the data set. As discussed above, the data values of the data set can be accessed (in order for an ordered data set) based on the relative location of the data values (or memory locations at which the data values are currently stored) to the data mark (or the memory location or locations at which the data mark is currently stored) and, for example, a position indicator. This relative location can be defined by a movement of permutation pattern used by a memory control module to move the data values of the data set. Alternatively, for example, if the data values of the data set are stored sequentially within the memory, the data values of the data set can be accessed by accessing memory location sequentially beginning at the memory location or locations at which the data mark is currently stored.

After the data values of the data set have been accessed or collected, the data set can be validated at block 1060 using a digest as discussed above. If the data set is validated, the data values are provided to the client at block 1070. If the data set is not validated, however, process 1000 proceeds to block 1030. For example, the data set can include data values that have the same value as the data mark. Thus, the memory control module can erroneously determine that these data values are the data mark at block 1020. However, in such cases, the data set will typically not be validated at block 1060 because a new digest generated from the data set recovered based on an erroneous data mark will be unlikely to match a digest generated based on the actual data set. Thus, process 1000 returns to block 1030 to move the data values and continue to search for the data mark.

Process 1000 can include additional or fewer blocks than those illustrated in FIG. 10. Additionally, one or more blocks can be rearranged or discarded. Furthermore, although process 1000 is discussed above with reference to an example environment within a memory control module, process 1000 is applicable within other environments.

Figure 11:
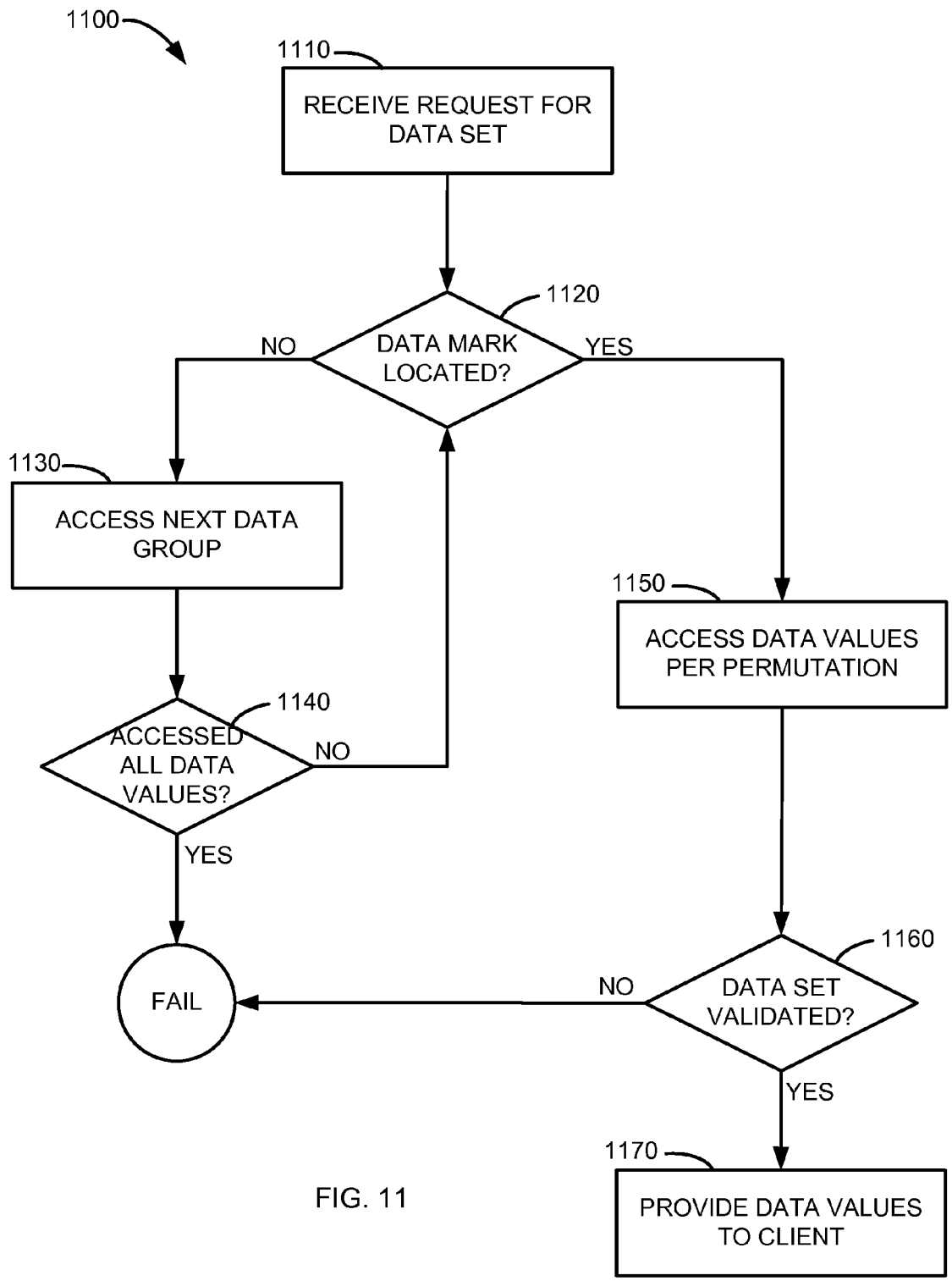
FIG. 11 is a flowchart of a process to access a data set at a memory, according to another implementation.

FIG. 11 is a flowchart of a process to access a data set at a memory, according to another implementation. Process 1100 can be implemented as a hardware module, as a software module hosted at a computing device, or as a combination thereof. For example, process 1100 can be implemented as application-specific circuitry or as a software module including instructions stored at a memory and executed at a processor in communication with the memory. More specifically, for example, process 1100 can be implemented at a memory control module.

A request for a data set stored at a memory is received, for example, at a memory control module at block 1110. The memory control module determines at block 1120 whether a data mark is included within a current group of data values. That is, the memory control module determines whether a current group of data values has a value equal to that of the value of the data mark. Said differently, the memory control module determines whether that group of data values is the data mark.

If the data mark is not located at that memory location or group of memory locations, process 1100 proceeds to block 1130 and a next group of data values is accessed. That is, rather than move or permute the data value within the memory, a memory controller can locate a next group of data values (i.e., a group of data values that has a length equal to that of the data mark) at the current memory locations of those data values. If the memory control module determines at block 1140 that all the data values (or memory locations at which the data values are stored) have been accessed, process 1100 can fail. That is, the data mark was not located at the memory.

If not all the data values have been accessed at block 1140, process 1100 returns to block 1120 to determine whether the current group of data values is the data mark. If the current group of data values is the data mark, at block 1120, process 1100 proceeds to block 1150 and the data values of the data set are accessed per the permutation (or movement) pattern of the memory control module.

Similar to as discussed in relation to FIG. 10, after the data values of the data set have been accessed or collected, the data set can be validated using a digest at block 1160. If the data set is validated, the data values are provided to the client at block 1170. If the data set is not validated, however, process 1100 fails. For example, the data set can include data values that have the same value as the data mark. Thus, the memory control module can erroneously determine that these data values are the data mark at block 1120. However, in such cases the data set will typically not be validated at block 1160 because a new digest generated based the data set recovered based on an erroneous data mark will be unlikely to match a digest generated based on the actual data set. Thus, process 1100 fails if the data set is not validated.

Process 1100 can include additional or fewer blocks than those illustrated in FIG. 11. Additionally, one or more blocks can be rearranged or discarded. For example, rather than process 1100 terminating in failure if the data set is not validated at block 1160, process 1100 can proceed to block 1130 to determine whether a different group of data values is the data mark resulting in a validated data set at a later iteration at block 1160. Furthermore, although process 1100 is discussed above with reference to an example environment within a memory control module, process 1100 is applicable within other environments.

Figure 12:
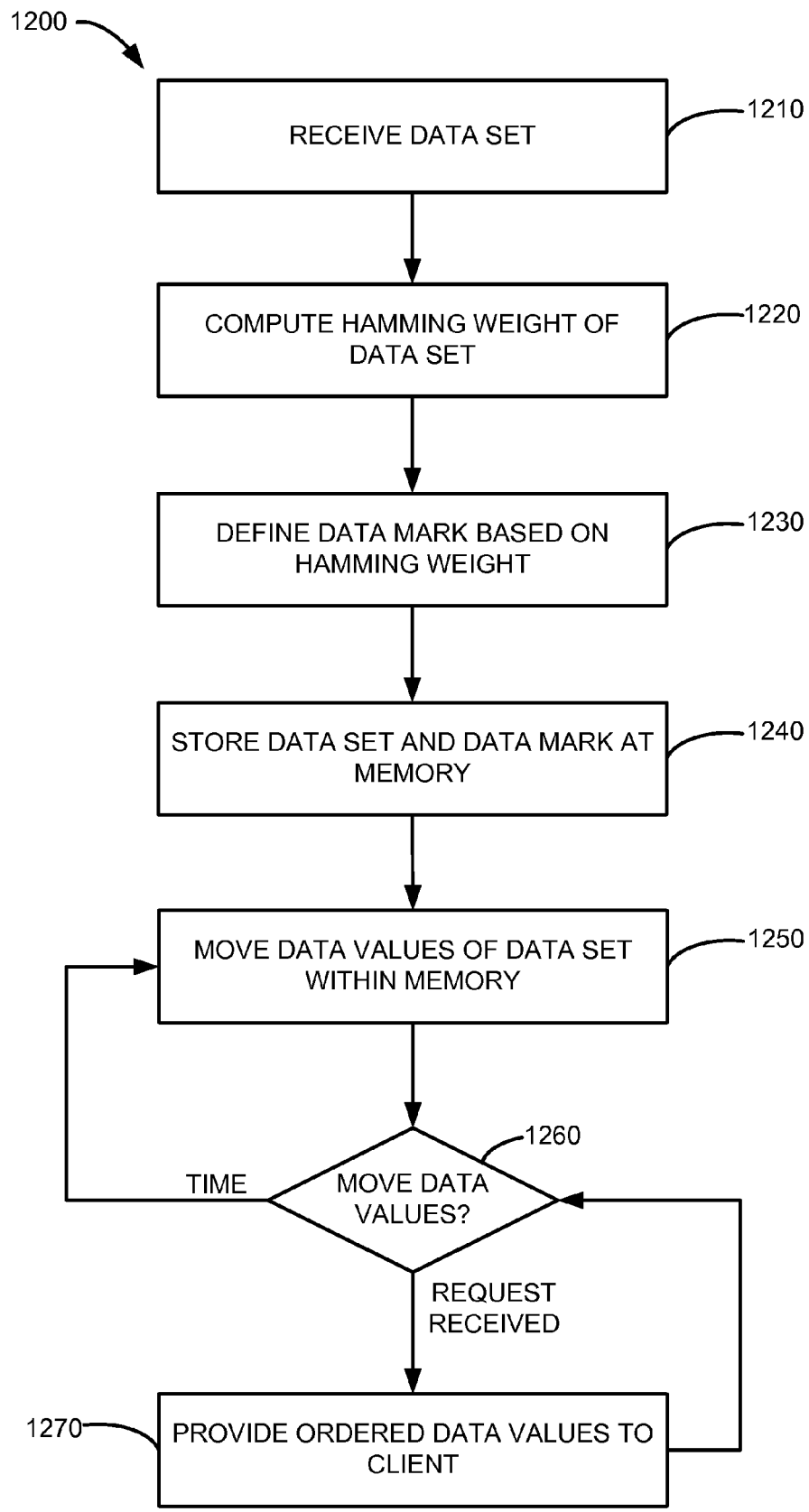
FIG. 12 is a flowchart of a process to prevent imprinting at a memory including defining a data mark, according to another implementation.

FIG. 12 is a flowchart of a process to prevent imprinting at a memory including defining a data mark, according to another implementation. Process 1200 can be implemented as a hardware module, as a software module hosted at a computing device, or as a combination thereof. For example, process 1200 can be implemented as application-specific circuitry or as a software module including instructions stored at a memory and executed at a processor in communication with the memory. More specifically, for example, process 1200 can be implemented at a memory control module.

A data set is received at block 1210. A Hamming weight of the data set is computed at block 1220 to determine, for example, a relationship between the numbers of each value that will be stored at the memory elements (or cells) of a memory when the data set is stored at the memory. For example, the Hamming weight can define a relationship between the numbers of each bit value (e.g., '1' values and '0' values) in a binary representation of the data set.

The Hamming weight is then used at block 1230 to determine a data mark for the data set. As discussed above, some memories or memory technologies are more susceptible to imprinting of particular values or states of the memory elements of those memories. Thus, a memory may be more susceptible to imprinting when '0' bit values are stored at the memory or when '1' bit values are stored at the memory. Based on the Hamming weight, the data mark can be chosen or generated to offset the Hamming weight of the data set. Accordingly, the Hamming weight of the data set including the data mark can offset or counteract (i.e., made neutral or be biased to states in which the memory is less susceptible to memory imprinting) the data set.

The data set and data mark are stored at the memory at block 1240, and the data values of the data set are moved within the memory to prevent memory imprinting as discussed above. More specifically, as illustrated in blocks 1250, 1260, and 1270, data values of the data set moved within the memory and the memory control module waits until the data values should be moved again (e.g., based on a time period or other stimulus or input) or a client requests the data set. If a client requests the data set, the data set is accessed and provided in order to the client.

Process 1200 can include additional or fewer blocks than those illustrated in FIG. 12. Additionally, one or more blocks can be rearranged or discarded. For example, rather than proceeding to block 1250 from block 1260 if the data values of the data set should be moved, process 1200 can proceed first to 1220 and define a new data mark, store the new data mark at the memory, and then move the data values. Thus, the data mark can change or be altered over time. Moreover, a measure of data values of the data set other than a Hamming weight can be used. For example, a count of a particular data value, such as a bit value of '1', for which the memory is particularly susceptible to imprinting can replace the Hamming weight in process 1200. Alternatively, the Hamming weight can be stored as part of a digest rather than as part of a data mark, and the digest can be moved with the data set. Furthermore, although process 1200 is discussed above with reference to an example environment within a communications network, process 1200 is applicable within other environments.

Figure 13:
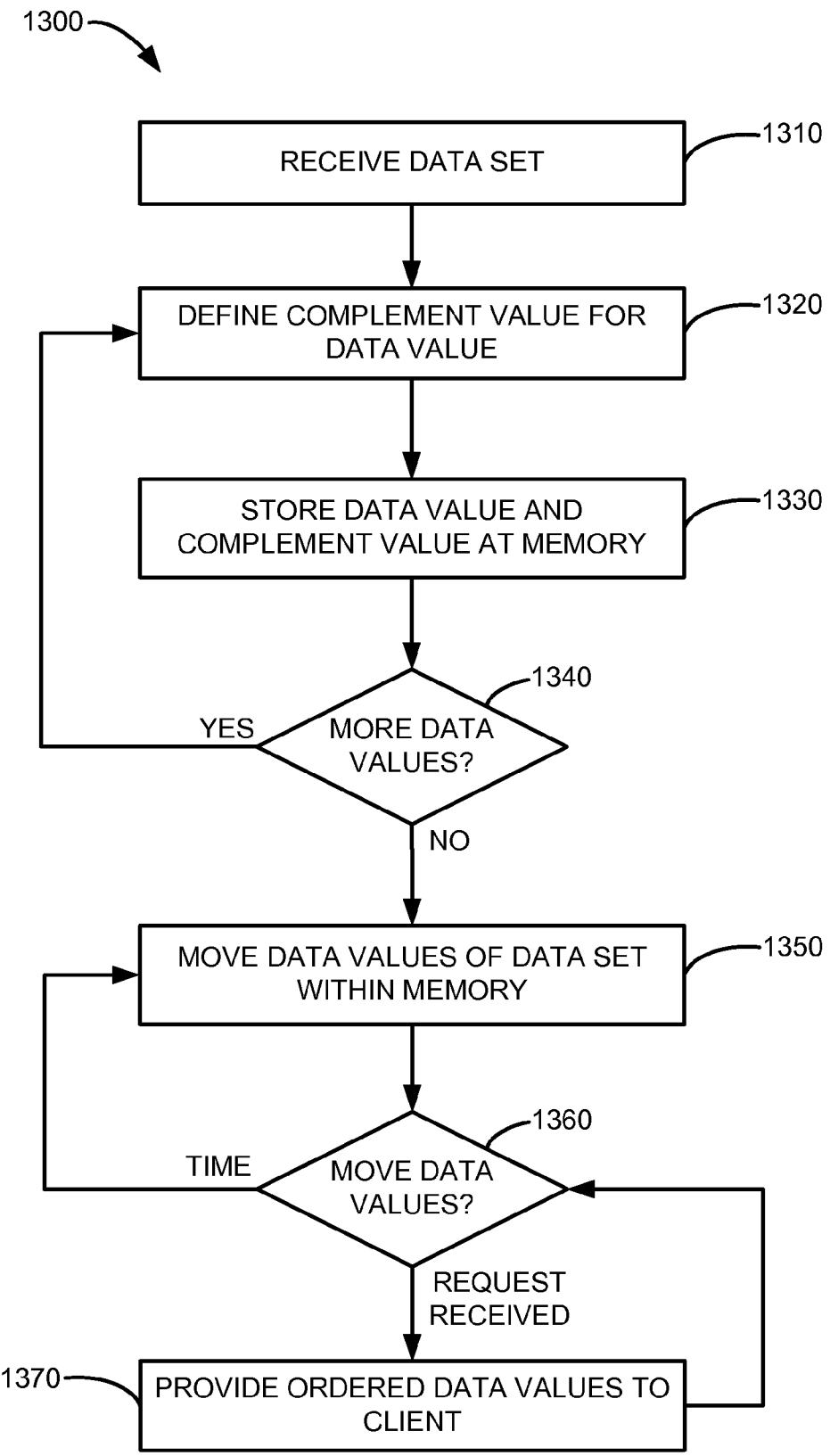
FIG. 13 is a flowchart of a process to prevent imprinting at a memory including defining complement data values, according to another implementation.

To further prevent or mitigate memory imprinting, complement data values can be included among the data values of a data set. FIG. 13 is a flowchart of a process to prevent imprinting at a memory including defining complement data values, according to another implementation. Process 1300 can be implemented as a hardware module, as a software module hosted at a computing device, or as a combination thereof. For example, process 1300 can be implemented as application-specific circuitry or as a software module including instructions stored at a memory and executed at a processor in communication with the memory. More specifically, for example, process 1300 can be implemented at a memory control module.

A data set is received at block 1310 including a group of data values. A complement data value for a data value from the data set is defined at block 1320. The complement value of each data value is a value that offsets or counteracts the effect of that data value on the memory. For example, the complement value can be the ones' complement of that data value, a value that has a Hamming weight opposing a Hamming weight of that data value, a value that results in the memory elements that store that value being in a state that is least or less susceptible to memory imprinting (i.e., a value that is represented by '0' bit values for a memory that is more susceptible to imprinting '1' bit values that '0' bit values), or some other value that offsets or counteracts the effect of that data value on the memory.

The data value and the complement value are stored at the memory at block 1330 and the memory control module determines at block 1340 whether there are additional data values in the data set for which a complement value has not been defined. For example, the complement value for each data value can be stored at a memory location immediately before or after the memory location at which that data value is stored. Alternatively, the complement data values can be stored at a block or group in the memory separate from the data values. Because the complement values and the data values are moving throughout the memory locations of the memory, the complement values can counteract the effects of the data values regardless of whether the complement values are stored in a relative proximity to the data values. If there are more data values at block 1340, process 1300 returns to block 1320.

If there are not more data values at block 1340, process 1300 proceeds to block 1350 and the data values of the data set are moved within the memory to prevent memory imprinting as discussed above. More specifically, as illustrated in blocks 1350, 1360, and 1370, data values of the data set moved within the memory and the memory control module waits until the data values should be moved again (e.g., based on a time period or other stimulus or input) or a client requests the data set. If a client requests the data set, the data values of the data set are accessed and provided in order to the client.

Process 1300 can include additional or fewer blocks than those illustrated in FIG. 13. For example, process 1300 can include a block between blocks 1360 and 1370 at which the complement values are discarded or ignored as the data values of the data set are collected before being provided to the client. That is, because the memory control module can determine the memory locations at which the data values are stored based on one or more of a data mark, a movement or permutation pattern, a position indicator, an iteration indicator, or other values stored at the memory, the memory control module can access the data values without accessing the complement values or can discard the complement values from the data values. In other words, the complement values are not provided to the client. Additionally, one or more blocks can be rearranged or discarded. Additionally, the complement can be used as part of all of a digest rather than as part of all of a data mark, and the digest can be moved with the data set. Furthermore, although process 1300 is discussed above with reference to an example environment within a communications network, process 1300 is applicable within other environments.

Figure 14:
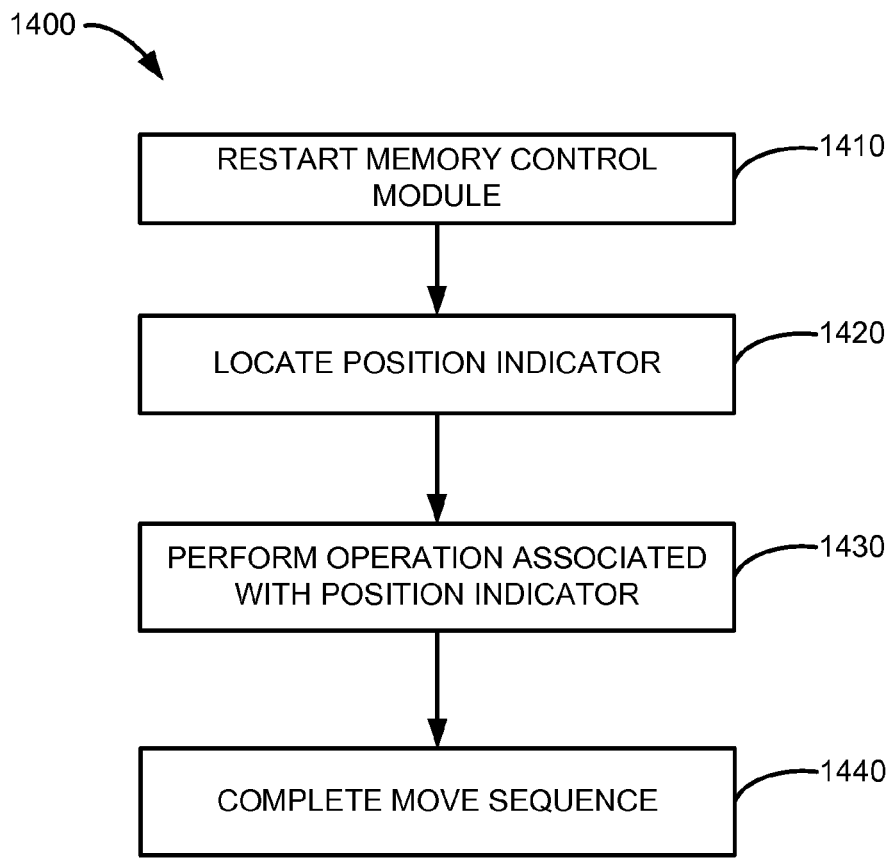
FIG. 14 is a flowchart of a process to access a data set at a memory after a failure, according to an implementation.
Figures 15A, 15B, 15C:
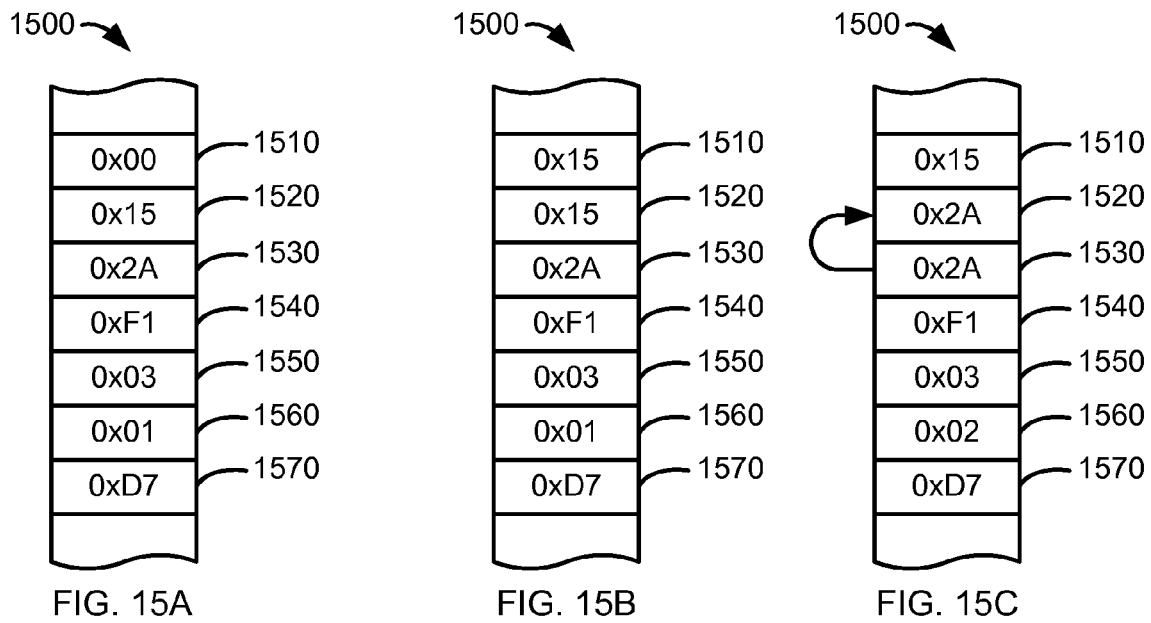
FIGS. 15A-15C are an illustration of the process of FIG. 14, according to the implementation discussed in relation to FIGS. 6A-6F.

FIG. 14 is a flowchart of a process to access a data set at a memory after a failure such as an interruption or power failure, according to an implementation. FIGS. 15A-15C are an illustration of the process of FIG. 14, according to the implementation discussed in relation to FIGS. 6A-6F. Process 1400 can be implemented as a hardware module, as a software module hosted at a computing device, or as a combination thereof. For example, process 1400 can be implemented as application-specific circuitry or as a software module including instructions stored at a memory and executed at a processor in communication with the memory. More specifically, for example, process 1400 can be implemented at a memory control module.

The memory control module is restarted at block 1410 and a position indicator is located at block 1420. For example FIG. 15A illustrates a portion of memory 1500 after a failure of a memory control module. The memory includes memory locations 1510, 1520, 1530, 1540, 1550, 1560, and 1570. A position indicator is at memory location 1560 and a digest of the data set is at memory location 1570. After the memory control module restarts, the memory control module locates the position indicator at memory location 1560 and determines that the position indicator has a value of 0x01. This value of the position indicator indicates that a first stage of a movement iteration was completed before the failure. More specifically, referring to the process of FIGS. 6A-6F, movement of the value (i.e., the data mark) from memory location 1520 to memory location 1510 was completed before the failure.

At block 1430, the memory control module performs the operation that is associated with the position indicator. With reference to the process of FIGS. 6A-6F, the operation that follows a position indicator of 0x01 is to move the value at memory location 1530 to memory location 1520. Thus, as illustrated in FIG. 15B, the value at memory location 1530 is moved to memory location 1520 and the position indicator is incremented to the next value. Specifically, as illustrated in FIG. 15C, the value 0x2A at memory location 1530 replaces the value of 0x15 at memory location 1520. This indicates that the failure occurred before this operation was completed. In some instances, the value may have already been moved from one memory location to another memory location according to a movement or permutation. Thus, after identifying the operation associated with the value of a position indicator, the memory control module can verify that the operation was completed and not repeat the operation, can verify that the operation was not completed and repeat or perform the operation, or omit the verification and simply repeat or perform the operation. Such repetition of the operation does not corrupt any data values because the same data value is written to the same memory location multiple times.

After the operation associated with the value of the position indicator is completed (or verified as complete), the move sequence or movement iteration is completed and a process to mitigate or prevent memory imprinting can continue. For example, a movement iteration can be completed as discussed in relation to FIGS. 6D-6F. Thus, a process to prevent memory imprinting can be resumed after a failure. In other words, processes to prevent memory imprinting can be fail-safe.

Process 1400 can include additional or fewer blocks than those illustrated in FIG. 14. For example, process 1400 can include one or more blocks to determine whether a failure occurred. As a specific example, a memory control module implementing process 1400 can access a non-volatile memory to determine whether a failure occurred based on a value indicating a prior operating condition of the memory control module. Additionally, one or more blocks can be rearranged or discarded. For example, process 1400 can include determining a value of an iteration indicator, a position or memory location (or locations) of a data mark within a memory, or a value of an iteration indicator and a position or memory location (or locations) of a data mark within a memory to determine at which state or stage of a movement or permutation iteration the failure occurred. Furthermore, although process 1400 is discussed above with reference to an example environment within a communications network, process 1400 is applicable within other environments.

Figure 16:
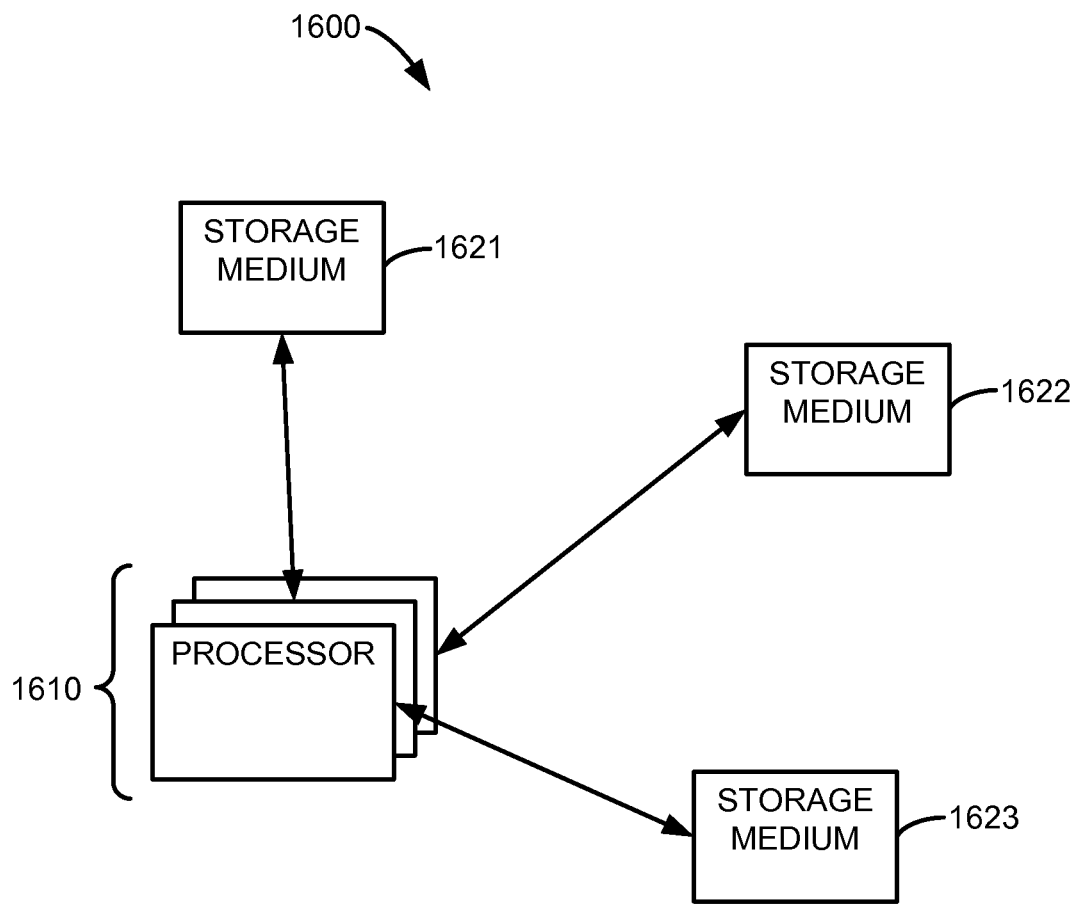
FIG. 16 is a schematic block diagram of a system including a processor and storage media, according to an embodiment.

As an example of a system including one or more processors and processor-readable storage media, FIG. 16 is a schematic block diagram of system 1600 including a processor and storage media, according to an embodiment. As illustrated in FIG. 16, system 1600 includes one or more processors 1610 operatively coupled to storage medium 1621, storage medium 1622, and storage medium 1623. One or more processors 1610 can access instructions or code at storage medium 1621, storage medium 1622, and storage medium 1623. Storage media 1621, 1622, and 1623 can be any processor-readable media or related devices to access processor-readable media. For example, storage medium 1621 can be a hard disk drive including a magnetic storage medium, storage medium 1622 can be an optical drive such as a DVD drive and can accept DVD storage media on which processor-readable instructions such as processor-readable instructions that implement a report generation tool can be stored, and storage medium 1623 can be a FLASH memory drive with a USB interface. In some embodiments, storage media 1621, 1622, or 1623 can be local to (e.g., coupled to a common computing device) one or more processors 1610. In some embodiments, storage media 1621, 1622, or 1623 can be remote from (e.g., coupled to a separate computing device) one or more processors 1610 and in communication with one or more processors 1610 via communications link. Furthermore, one or more of storage media 1621, 1622, or 1623 can be local to one or more processors 1610 and one or more of the remaining of storage media 1621, 1622, or 1623 can be remote from one or more processors 1610.

As a more specific example, one or more processors 1610 can be included within a computing device such as a communications device having an internal hard disk drive data store represented by storage medium 1621 and a removable solid-state data store such as a Secure Digital High-Capacity ("SDHC") memory card represented by storage medium 1622. The computing device can also include a USB host controller to communicate with a USB FLASH memory drive represented by storage medium 1623. One or more processors 1610 can access processor-readable instructions such as processor-readable instructions that implement a memory control module at any of storage media 1621, 1622, or 1623. Said differently, one or more processors 1610 can interpret or execute instructions at processor-readable media via storage medium 1621, storage medium 1622, or storage medium 1623. For example, a computing device can execute a memory control module such as a device driver or software application stored at a remote storage medium.

Alternatively, for example, storage media 1621 and 1622 can be remote from a computing device including one or more processors 1610 and storage medium 1623 can be local to that computing device. The computing device including one or more processors 1610 can download a memory control module such as a device driver or software application from one or both of remote storage media 1621 or 1622 via communications link such as a communications network to local storage medium 1623 and execute the memory control module from local storage medium 1623.

In some embodiments, system 1600 can include one or more memories such as RAM that function as a cache between one or more of storage medium 1621, storage medium 1622, or storage medium 1623 and one or more processors 1610 for instructions or code stored (or accessible) at one or more of storage medium 1621, storage medium 1622, or storage medium 1623.

While certain embodiments have been shown and described above, various changes in form and details may be made. For example, some features that have been described in relation to one embodiment or process can be related to other embodiments. In other words, processes, features, components, or properties described in relation to one embodiment can be useful in other embodiments. Furthermore, it should be understood that the systems and methods described herein can include various combinations or sub-combinations of the components or features of the different embodiments described. As a specific example, embodiments discussed in relation to a communications network can be applicable to other information systems. Thus, features described with reference to one or more embodiments can be combined with other embodiments described herein.

What is claimed is:

1. A non-transitory processor-readable medium storing code representing instructions to cause a processor to perform a process, the process comprising:

storing a data set at a memory having a plurality of memory locations, the data set including a plurality of data values having an order, each data value from the data set stored at a current memory location of that data value from the plurality of memory locations;

periodically moving each data value from the data set from the current memory location of that data value from the plurality of memory locations to a next memory location of that data value from the plurality of memory locations, the next memory location of each data value from the plurality of memory locations being the current memory location of that data value from the plurality of memory locations after the moving;

updating a position indicator to be associated with a current periodic state of a movement of the data set after moving the plurality of data values from the current memory locations to the next memory locations, wherein the current periodic state of the movement of the data set is based on a periodic movement pattern; and providing the plurality of data values in the order to a client in response to a request for the data set.

2. The processor-readable medium of claim 1, wherein the next memory location for each data value from the data set is a current memory location of a different data value from the data set.

3. The processor-readable medium of claim 1, wherein:
the memory locations of the memory are sequential; and
the moving includes rotating each data value from the data set from the current memory location of that data value to the next memory location of that data value, the next memory location of that data value sequentially subsequent to the current memory location of that data value.

4. The processor-readable medium of claim 1, wherein:
the memory locations of the memory are sequential; and
the moving is based on a permutation of each data value from the data set from the current memory location of that data value to the next memory location of that data value, the next memory location of at least one data value from the data set not sequentially subsequent to the current memory location of the at least one data value.

5. The processor-readable medium of claim 1, wherein:
the memory locations of the memory are sequential; and
the moving is based on a time-dependent permutation of each data value from the data set from the current memory location of that data value to the next memory location of that data value, the next memory location of at least one data value from the data set not sequentially subsequent to the current memory location of the at least one data value.

6. The processor-readable medium of claim 1, the process further comprising:
identifying the position indicator within the memory; and
determining a current memory location of a first data value from the data set based on the position indicator.

7. The processor-readable medium of claim 1, the process further comprising:
identifying a predetermined digest of the data set at memory;
accessing successively according to the order each data value from the data set;
generating a digest of the data set based on the data values from the data set and the order; and
comparing the digest of the data set to the predetermined digest.

8. The processor-readable medium of claim 1, wherein the data set includes data values defining a data mark, the process further comprising:
generating the data values defining the data mark based on a Hamming weight value of other data values of the data set.

9. The processor-readable medium of claim 1, wherein the data set includes a first data set and a second data set, the process further comprising:

generating each data value from the second data set based on a logical operation applied to an associated data value from the first data set.

10. An apparatus to prevent memory imprinting, comprising:

a memory having a plurality of memory locations; and
a memory controller operatively coupled to the memory to:
store data values from a data set at the memory;
periodically move each data value from the data set from a current memory location to a next memory location according to a periodic movement pattern; and
update a position indicator to be associated with a current periodic state of movement of the data set based on the periodic movement pattern.

11. The apparatus of claim 10, further comprising:

a processor in communication with the memory and memory controller to execute code representing instructions that collectively implement a software application,
the memory controller configured to periodically move each data value from the data from a current memory location to a next memory location independent of the processor and the code representing instructions that collectively implement the software application.

12. The apparatus of claim 10, wherein the memory controller is configured to:

identify a data mark within the memory; and
determine a current memory location of a first data value from the data set based on the data mark.

13. The apparatus of claim 10, wherein:

the data values have an order within the data set; and
the memory controller is configured to:
identify a predetermined digest of the data set at memory;
access successively according to the order each data value from the data set;
generate a digest of the data set based on the data values from the data set and the order; and
validate the data set if the digest of the data set matches the predetermined digest.

14. The apparatus of claim 10, further comprising:

a processor in communication with the memory to host the memory controller.

15. The apparatus of claim 10, wherein:

the data set includes data values defining a data mark; and
the memory controller is configured to generate the data values defining the data mark based on a Hamming weight value of other data values of the data set.

16. The apparatus of claim 10, wherein the data set includes a first data set and a second data set; and
the memory controller is configured to generate each data value from the second data set based on a logical operation applied to an associated data value from the first data set.

17. A method to prevent memory imprinting, comprising:

storing a position indicator and each data value from a data set at a memory location from a plurality of memory locations of a memory, the data set including a first data value and a last data value, the data set including a data mark, the position indicator associated with the memory location storing the first data value;
moving a data value from the data set from a current memory location of that data value to a next memory location of that data value, the position indicator associated with the current memory location;
updating the position indicator to associate with position indicator with a different memory location from the plurality of memory locations; and
repeating the moving and the updating until the last data value is located at the memory location at which the first data value was located before the moving.

18. The method of claim 17, further comprising:

accessing the position indicator to determine a current permutation state of the data set;
identifying a current memory location of the data mark within the memory; and
determining a current memory location of a first data value from the data set based on the data mark and the permutation state.

19. The method of claim 17, wherein the moving includes rotating each data value from the data set from the current memory location of that data value to the next memory location of that data value, the next memory location of that data value sequentially subsequent to the current memory location of that data value.

20. The method of claim 17, wherein the moving is based on a permutation of each data value from the data set from the current memory location of that data value to the next memory location of that data value, the next memory location of at least one data value from the data set not sequentially subsequent to the current memory location of the at least one data value.

21. The method of claim 17, wherein the moving is based on a time-dependent permutation of each data value from the data set from the current memory location of that data value to the next memory location of that data value, the next memory location of at least one data value from the data set not sequentially subsequent to the current memory location of the at least one data value.

* * * * *